US012284331B2

(12) United States Patent
Zhao et al.

(10) Patent No.: US 12,284,331 B2
(45) Date of Patent: Apr. 22, 2025

(54) SUBBLOCK-BASED MOTION VECTOR PREDICTOR WITH MV OFFSET DERIVED BY TEMPLATE MATCHING

(71) Applicant: Tencent America LLC, Palo Alto, CA (US)

(72) Inventors: Xin Zhao, Santa Clara, CA (US); Lien-Fei Chen, Hsinchu (TW); Han Gao, San Diego, CA (US); Guichun Li, San Jose, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 154 days.

(21) Appl. No.: 17/983,866

(22) Filed: Nov. 9, 2022

(65) Prior Publication Data

US 2023/0421751 A1   Dec. 28, 2023

Related U.S. Application Data

(60) Provisional application No. 63/344,840, filed on May 23, 2022.

(51) Int. Cl.
*H04N 19/105*    (2014.01)
*H04N 19/139*    (2014.01)
(Continued)

(52) U.S. Cl.
CPC ......... *H04N 19/105* (2014.11); *H04N 19/139* (2014.11); *H04N 19/176* (2014.11); *H04N 19/521* (2014.11)

(58) Field of Classification Search
CPC .. H04N 19/105; H04N 19/139; H04N 19/176; H04N 19/521
See application file for complete search history.

(56) References Cited

U.S. PATENT DOCUMENTS

| 10,448,026 | B1* | 10/2019 | Xu .................... H04N 19/105 |
| 2021/0392367 | A1* | 12/2021 | Zhang ................ H04N 19/139 |
| 2023/0362403 | A1* | 11/2023 | Lo .................... H04N 19/176 |

OTHER PUBLICATIONS

Muhammed Coban, et al., Algorithm description of Enhanced Compression Model 4 (ECM 4), Joint Video Experts Team (JVET) of ITU-T SG 16 WP 3 and ISO/IEC JTC 1/SC 29, 23rd Meeting, by teleconference, Jul. 7-16, 2021, Document: JVET-Y2025-v2, pp. 1-32.

(Continued)

*Primary Examiner* — Kyle M Lotfi
(74) *Attorney, Agent, or Firm* — ArentFox Schiff LLP

(57) ABSTRACT

A coded video bitstream comprising a current block in a current picture is received. The current block includes a plurality of subblocks and is to be predicted by a subblock-based template matching motion vector prediction (SbTMVP) mode. A respective collocated reference subblock for each subblock is determined based on a combination of a displacement vector (DV) and a motion vector offset (MVO) that are associated with the respective subblock. A motion vector (MV) field in the respective collocated reference subblock of each subblock in the current block is determined. A respective reference template for each subblock is derived based on the determined MV field of the collocated reference subblock. The plurality of subblocks of the current block is reconstructed by predicting each subblock using the respective reference template in the SbTMVP mode.

20 Claims, 22 Drawing Sheets

(51) Int. Cl.
  *H04N 19/176* (2014.01)
  *H04N 19/513* (2014.01)

(56) References Cited

OTHER PUBLICATIONS

H. Yang, H. Chen, J. Chen, S. Esenlik, S. Sethuraman, X. Xiu, E. Alshina, and J. Luo, "Subblock-Based Motion Derivation and Inter Prediction Refinement in Versatile Video Coding Standard", IEEE Trans. Circuits Syst. Video Technol., vol. 31, No. 10, pp. 3862-3877, Oct. 2021.

ITU-T Study Group. "High efficiency video coding, Series H: Audiovisual and multimedia systems: Infrastructure of audiovisual services—coding of moving video." in General Secretariat and Telecom Radiocommunication (ITU-R) Standardization (ITU-T), sec. H 265, Dec. 2016, pp. 1-664.

ITU-T Study Group. "Versatile video coding, Series H: Audiovisual and multimedia systems: Infrastructure of audiovisual services—coding of moving video." in General Secretariat and Telecom Radiocommunication (ITU-R) Standardization (ITU-T), sec. H 266, Aug. 2020, pp. 1-664.

* cited by examiner

SUBBLOCK-BASED MOTION VECTOR PREDICTOR WITH MV OFFSET DERIVED BY TEMPLATE MATCHING

INCORPORATION BY REFERENCE

The present application claims the benefit of priority to U.S. Provisional Application No. 63/344,840, "Subblock Based Motion Vector Predictor With MV Offset Derived By Template Matching" filed on May 23, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example, MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, a specific technique in use can be coded as a specific intra prediction mode that uses the specific technique. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore, no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Image and/or video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry.

According to an aspect of the disclosure, a method of video decoding performed in a video decoder is provided. In the method, a coded video bitstream comprising a current block in a current picture can be received. The current block includes a plurality of subblocks and is to be predicted by a subblock-based template matching motion vector prediction (SbTMVP) mode. A respective collocated reference subblock for each subblock can be determined based on a combination of a displacement vector (DV) and a motion vector offset (MVO) that are associated with the respective subblock. A motion vector (MV) field in the respective collocated reference subblock of each subblock in the current block can be determined. A respective reference template for each subblock can be derived based on the determined MV field of the collocated reference subblock. The plurality of subblocks of the current block can be reconstructed by predicting each subblock using the respective reference template in the SbTMVP mode.

To determine the respective collocated reference subblock, a search area positioned in one of the current picture and a reference picture of the current picture can be determined. One or more reference blocks of the current block can be determined based on template matching of a template of the current block to a template of each of the one or more reference blocks in the search area. The template of the current block can include samples adjacent to the current block. The template of each of the one or more reference blocks can include samples adjacent to the respective reference block of the one or more reference blocks. The respective collocated reference subblock for each subblock can be determined as a subblock that is collocated with the respective subblock in one of the one or more reference blocks.

The template matching of the template of the current block to the template of each of the one or more reference blocks can be determined based on one of a sum of absolute difference (SAD), a sum of absolute transformed difference (SATD), a sum of squares error (SSE), a sub-sampled SAD, and a mean-removed SAD.

To determine the one or more reference blocks, a plurality of candidate reference blocks can be determined in the search area. A plurality of cost values can be determined based on the template matching of the template of the current block to templates of the plurality of candidate reference blocks. The one or more reference blocks can be determined as the one or more candidate reference blocks of the plurality of candidate reference blocks that correspond to one or more lowest cost values of the plurality of cost values.

In an embodiment, the search area can include one of (i) a region centered at a position that is collocated with the current block in the reference picture and (ii) a region centered on the current block in the current picture.

In an example, the search area can be determined based on a displacement vector (DV). The DV can be derived from one of (i) a motion vector of a spatially neighboring block of the current block and (ii) a motion vector of a merge candidate list of the current block.

In an example, the search area can be determined as a region centered at a sample indicated by the DV, where the region can be one of square-shaped, rectangular-shaped, and diamond-shaped.

In an example, the search area can be determined as a group of samples centered at a sample indicated by the DV. The group of samples can be located at at least one of 0 degrees, 45 degrees, 90 degrees, or 135 degrees with respect to the sample indicated by the DV.

To determine the one or more reference blocks, a first reference block of the one or more reference blocks can be determined. The first reference block can be indicated by a first displacement vector (DV) from the template of the current block to a template of the first reference block. In an example, the first DV can be derived based on the template matching such that the first DV corresponds to a cost value associated with a difference between the template of the first reference block and the template of the current block. In an example, the first DV can be signaled.

The search area can be determined based on a first displacement vector (DV) that is derived before the template matching. A first reference block of the one or more reference blocks can be determined based on a second DV from the template of the current block to a template of the first reference block. The second DV can be derived based on the template matching such that the second DV corresponds to a cost value associated with a difference between the template of the first reference block and the template of the current block.

To reconstruct the subblocks of the current block, one or more motion vectors (MVs) of a first subblock of the plurality of subblocks in the current block can be determined based on one or more MVs of subblocks that are collocated with the first subblock in the one or more reference blocks. One or more prediction subblocks of the first subblock of the plurality of subblocks can be determined based on the one or more MVs of the first subblock. Prediction samples of the first subblock can be determined based on one or a weighted combination of the one or more prediction subblocks.

In some embodiments, a plurality of candidate reference blocks of the current block can be determined based on a plurality of displacement vectors (DVs). Each of the plurality of candidate reference blocks can be indicated by a respective DV of the plurality of DVs. The one or more reference blocks of the current block can be determined from the plurality of candidate reference blocks based on one or more cost values of the template matching.

According to another aspect of the disclosure, an apparatus is provided. The apparatus includes processing circuitry. The processing circuitry can be configured to perform any of the methods for video encoding/decoding.

Aspects of the disclosure also provide a non-transitory computer-readable medium storing instructions which when executed by a computer for video decoding cause the computer to perform any of the methods for video encoding/decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1A:
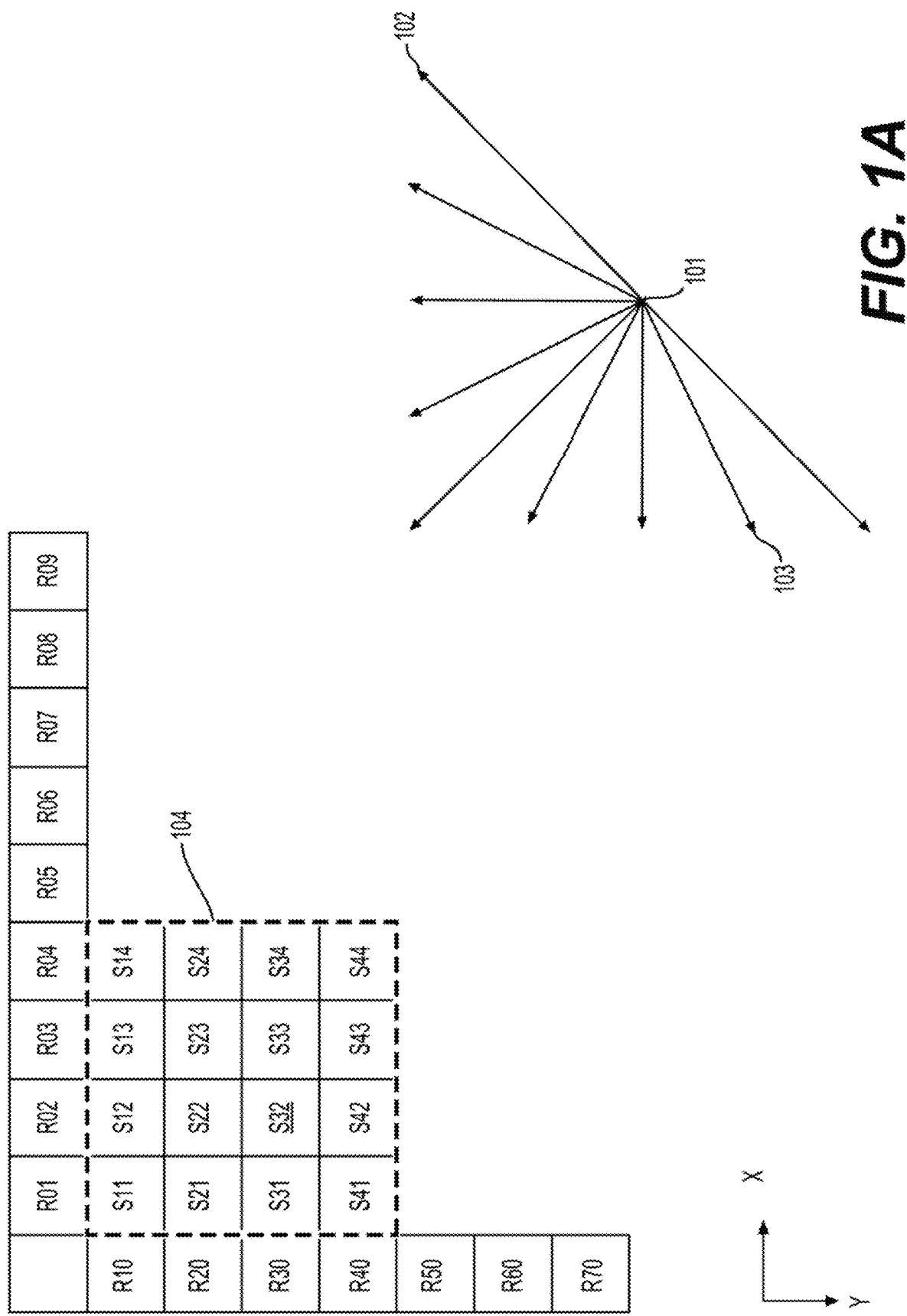
FIG. 1A is a schematic illustration of an exemplary subset of intra prediction modes.
Figure 1B:
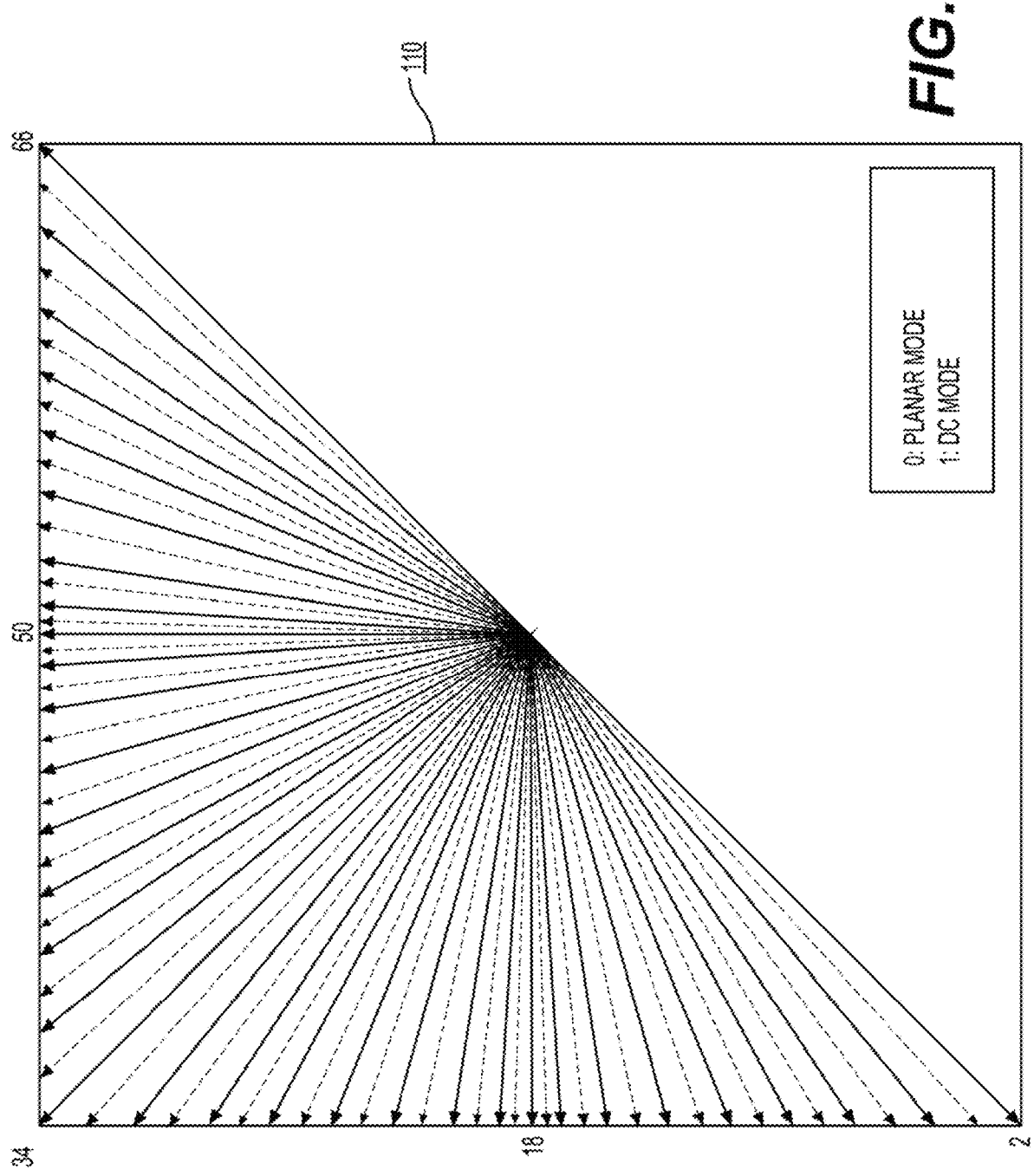
FIG. 1B is an illustration of exemplary intra prediction directions.
Figure 2:
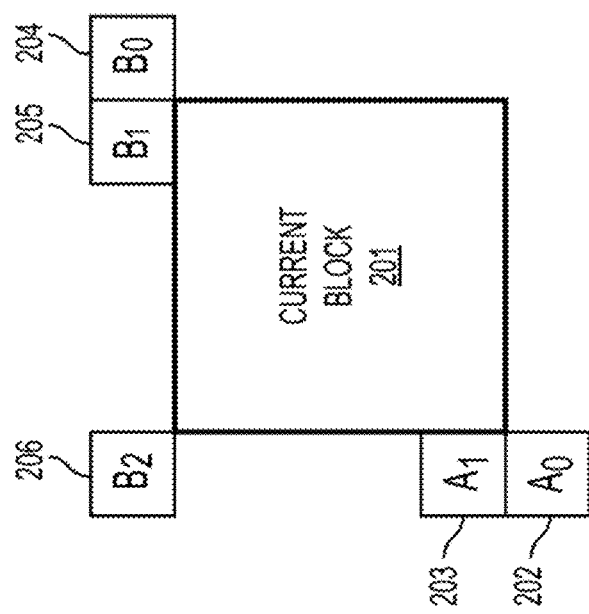
FIG. 2 is a schematic illustration of a current block and its surrounding spatial merge candidates in one example.
Figure 3:
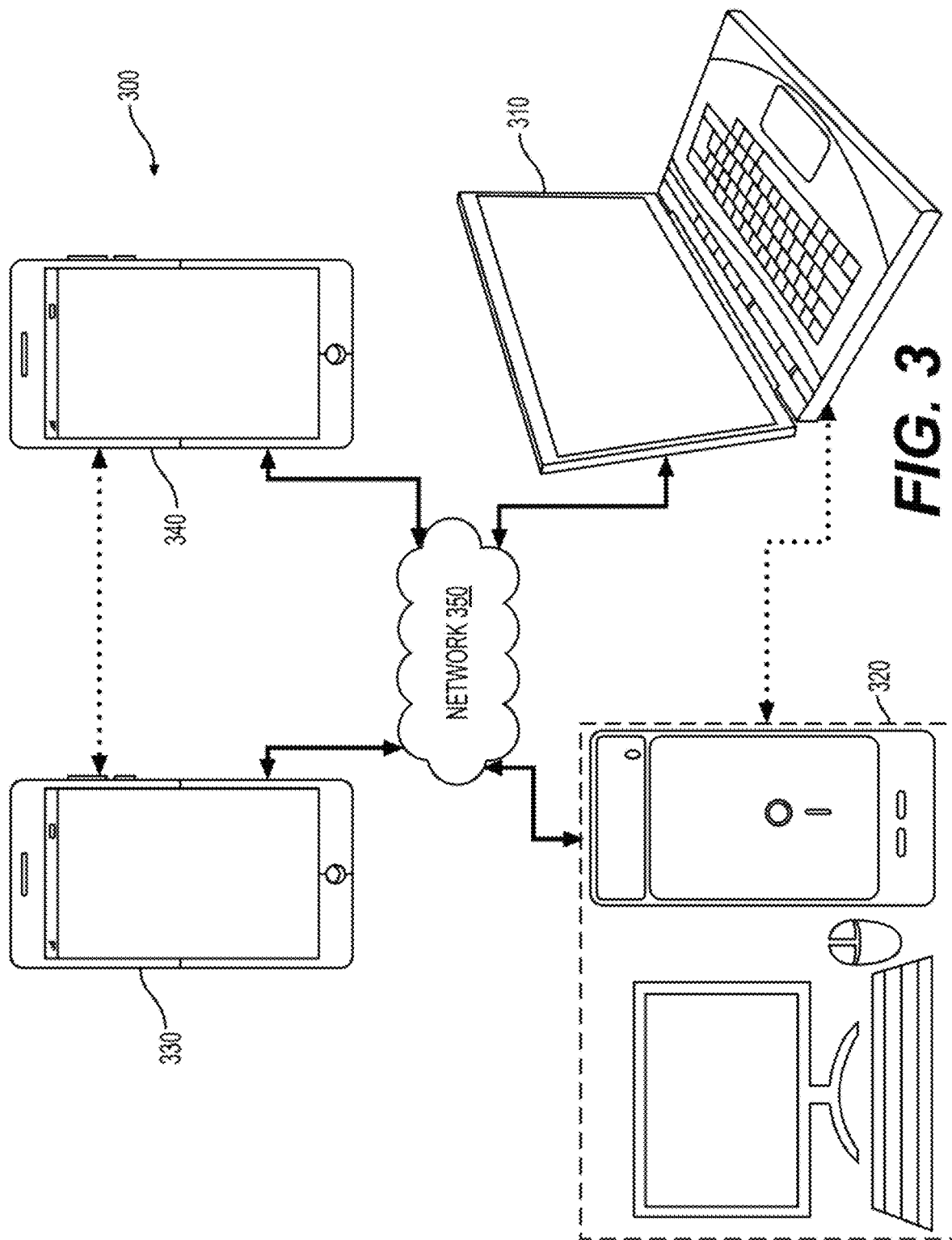
FIG. 3 is a schematic illustration of a simplified block diagram of a communication system (300) in accordance with an embodiment.

FIG. 3 illustrates an exemplary block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that perform bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
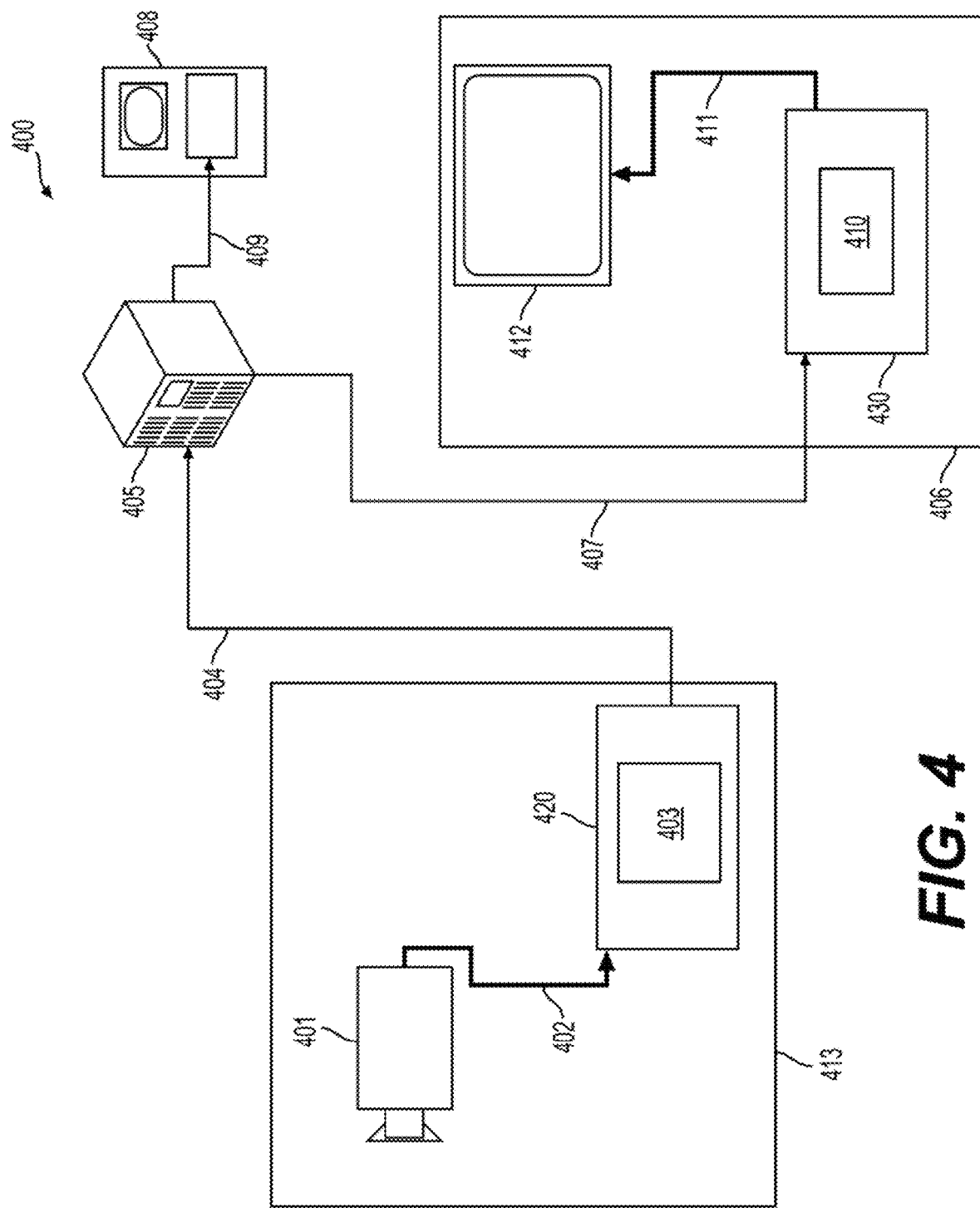
FIG. 4 is a schematic illustration of a simplified block diagram of a communication system (400) in accordance with an embodiment.

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
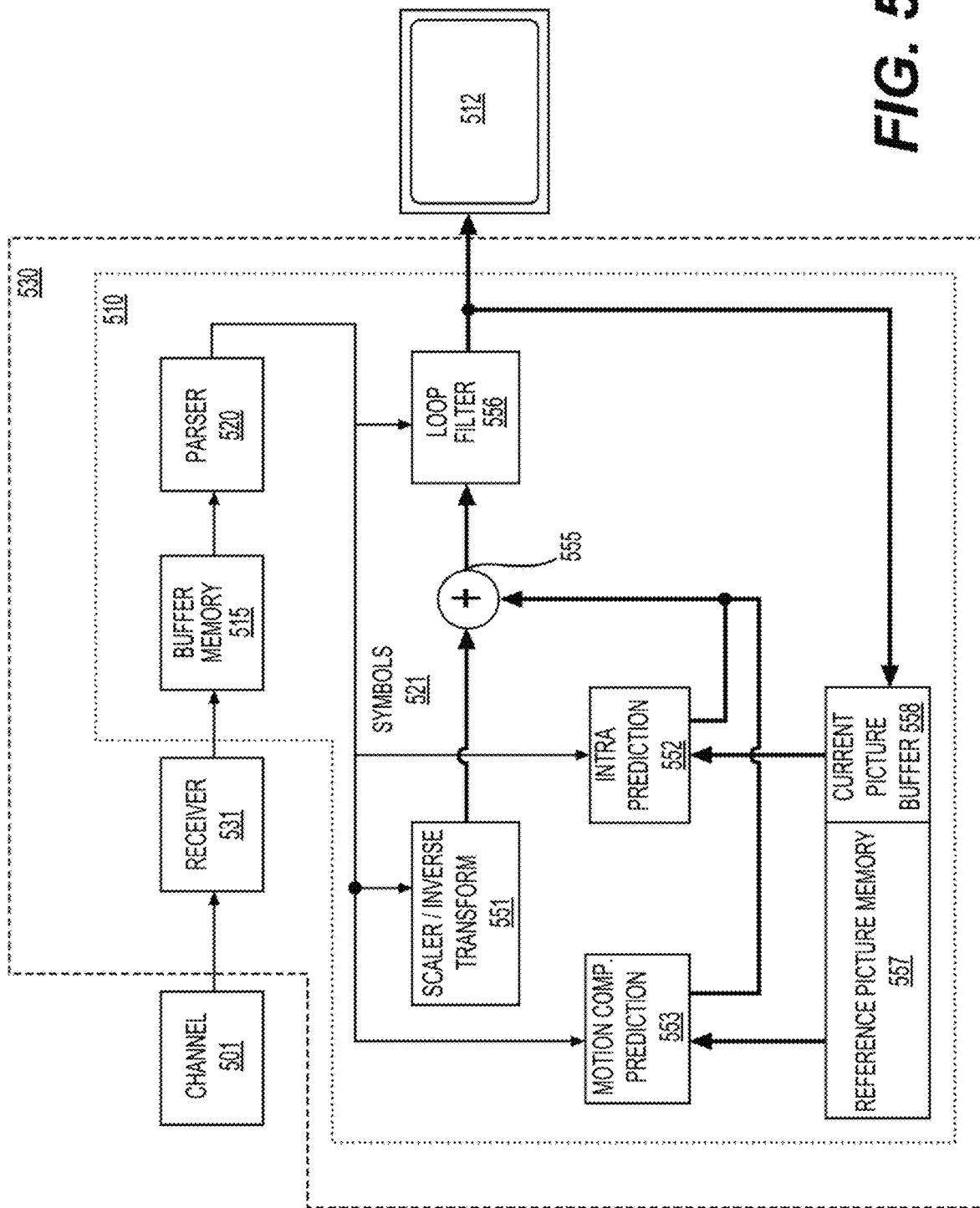
FIG. 5 is a schematic illustration of a simplified block diagram of a decoder in accordance with an embodiment.

FIG. 5 shows an exemplary block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an embodiment, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated, block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
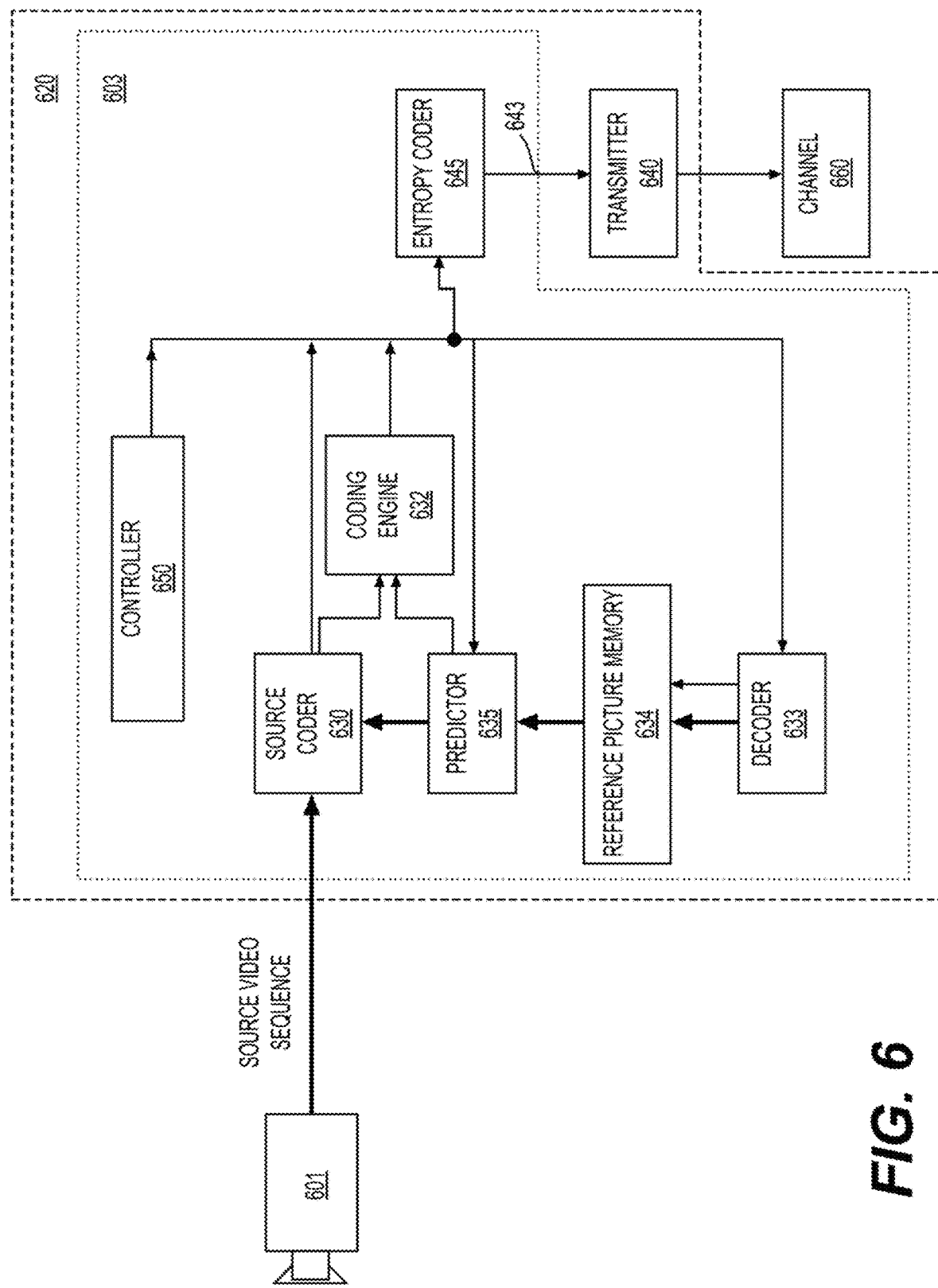
FIG. 6 is a schematic illustration of a simplified block diagram of an encoder in accordance with an embodiment.

FIG. 6 shows an exemplary block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
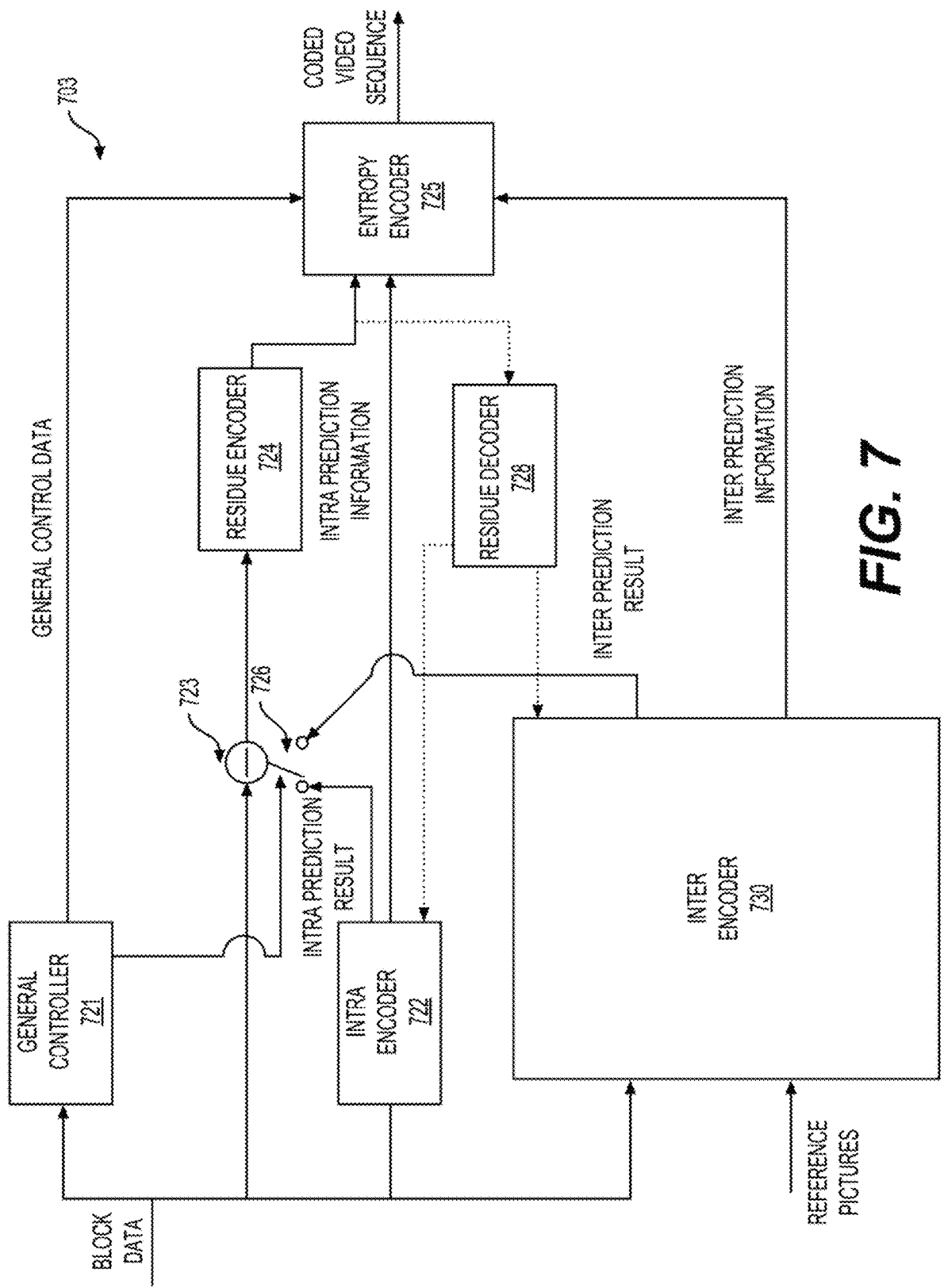
FIG. 7 shows a block diagram of an encoder in accordance with another embodiment.

FIG. 7 shows an exemplary diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
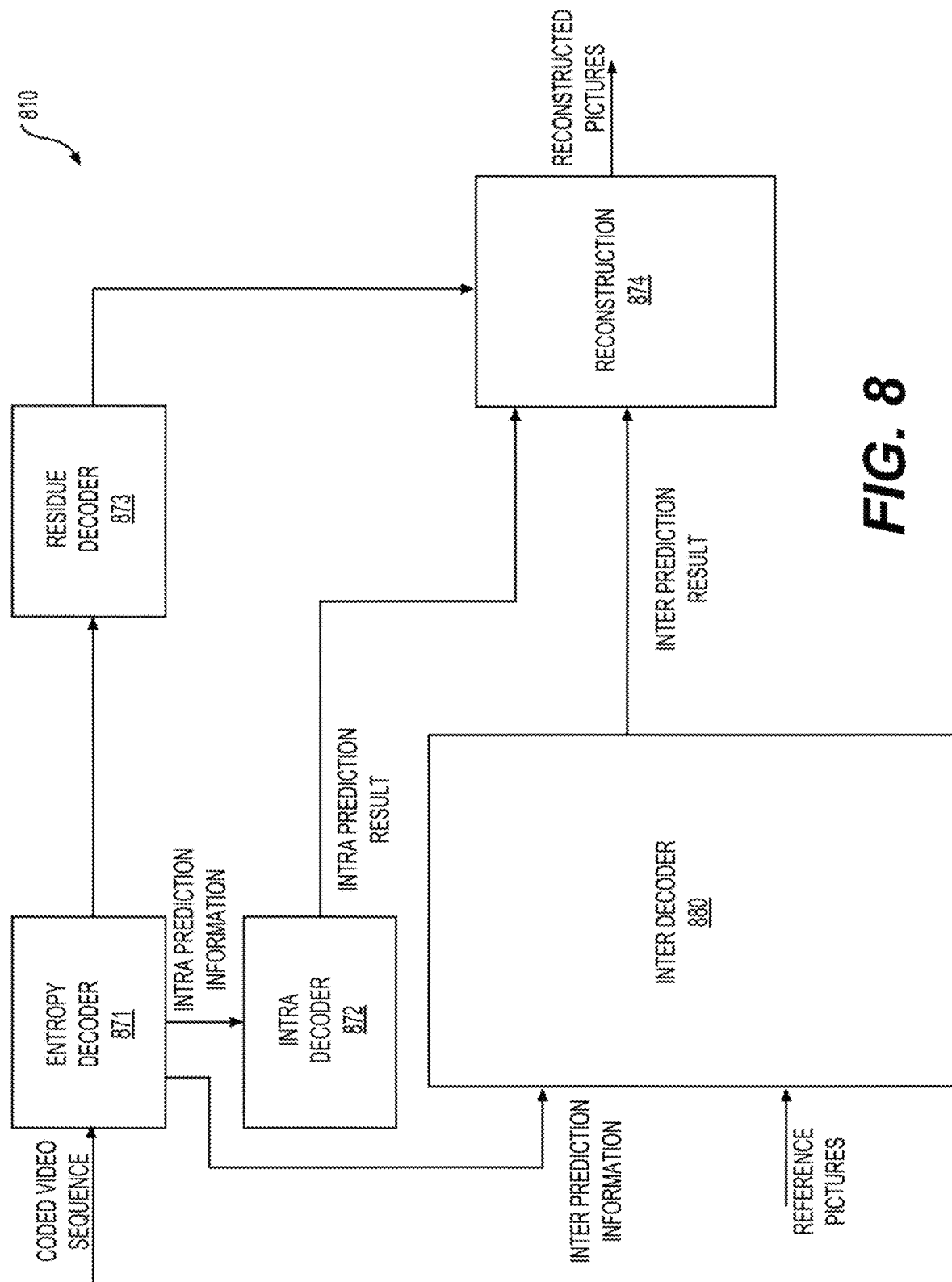
FIG. 8 shows a block diagram of a decoder in accordance with another embodiment.

FIG. 8 shows an exemplary diagram of a video decoder (810). The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

The disclosure includes embodiments related to derivation of a subblock-based temporal motion vector prediction (SbTMVP). The SbTMVP may be derived by using a displacement motion vector with a motion vector offset.

ITU-T VCEG (Q6/16) and ISO/IEC MPEG (JTC 1/SC 29/WG 11) published the H.265/HEVC (High Efficiency Video Coding) standard in 2013 (version 1), 2014 (version 2), 2015 (version 3), and 2016 (version 4). In 2015, the two standard organizations jointly formed the JVET (Joint Video Exploration Team) to explore the potential of developing the next video coding standard beyond HEVC. In October 2017, the two standard organizations issued the Joint Call for Proposals on Video Compression with Capability beyond HEVC (CfP). By February 2018, 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/ 10th JVET meeting. As a result of this meeting, JVET formally launched the standardization process of next-generation video coding beyond HEVC, the new standard was named Versatile Video Coding (VVC), and JVET was renamed as Joint Video Experts Team. In 2020, ITU-T VCEG (Q6/16) and ISO/IEC MPEG (JTC 1/SC 29/WG 11) published the VVC video coding standard (version 1).

In inter prediction, for each inter-predicted coding unit (CU), motion parameters are required for coding features of VVC, for example, to be used for the inter-predicted sample generation. The motion parameters can include motion vectors, reference picture indices, a reference picture list usage index, and/or additional information. The motion parameters can be signaled in an explicit or implicit manner. When a CU is coded with a skip mode, the CU can be associated with one PU, and a significant residual coefficient, a coded motion vector delta, and/or a reference picture index may not be required. When a CU is coded with a merge mode, the motion parameters for the CU can be obtained from neighboring CUs. The neighboring CUs can include spatial and temporal candidates, and additional schedules (or additional candidates) such as introduced in VVC. The merge mode can be applied to any inter-predicted CU, not only to skip mode. An alternative to the merge mode is an explicit transmission of motion parameters, where a motion vector, a corresponding reference picture index for each reference picture list, a reference picture list usage flag, and/or other needed information can be signaled explicitly per CU.

In VVC, a VVC Test model (VTM) reference software can include a number of new and refined inter prediction coding tools, which can include one or more of the following:

(1) Extended merge prediction
(2) Merge motion vector difference (IVINIVD)
(3) AMVP mode with symmetric MVD signalling
(4) Affine motion compensated prediction (5) Subblock-based temporal motion vector prediction (SbTMVP)
(6) Adaptive motion vector resolution (AMVR)
(7) Motion field storage: $\frac{1}{16}^{th}$ luma sample MV storage and 8×8 motion field compression
(8) Bi-prediction with CU-level weights (BCW)
(9) Bi-directional optical flow (BDOF)
(10) Decoder side motion vector refinement (DMVR)
(11) Combined inter and intra prediction (CIIP)
(12) Geometric partitioning mode (GPM)

A merge candidate list can be constructed by including five types of candidates, such as in VTM 4. The merge candidate list can be constructed in an order as follows:
(1) Spatial MVP from spatial neighbour CUs,
(2) Temporal MVP from collocated CUs,
(3) History-based MVP from a FIFO table,
(4) Pairwise average MVP, and
(5) Zero MVs.

A size of the merge list can be signalled in a slice header. A maximum allowed size of the merge list can be 6, such as in VTM 4. For each CU coded in the merge mode, an index of a best merge candidate can be encoded, for example using a truncated unary binarization. A first bin of the merge index can be coded with a context and a bypass coding can be used for other bins.

Figure 9:
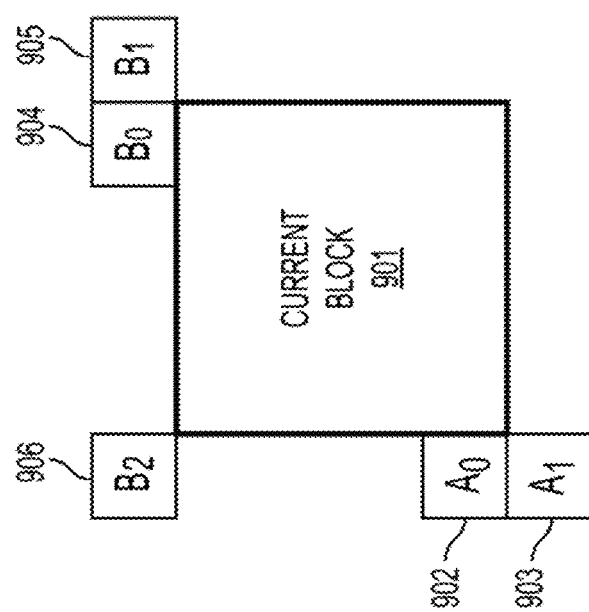
FIG. 9 shows exemplary positions of spatial merge candidates with another embodiment.
Figure 10:
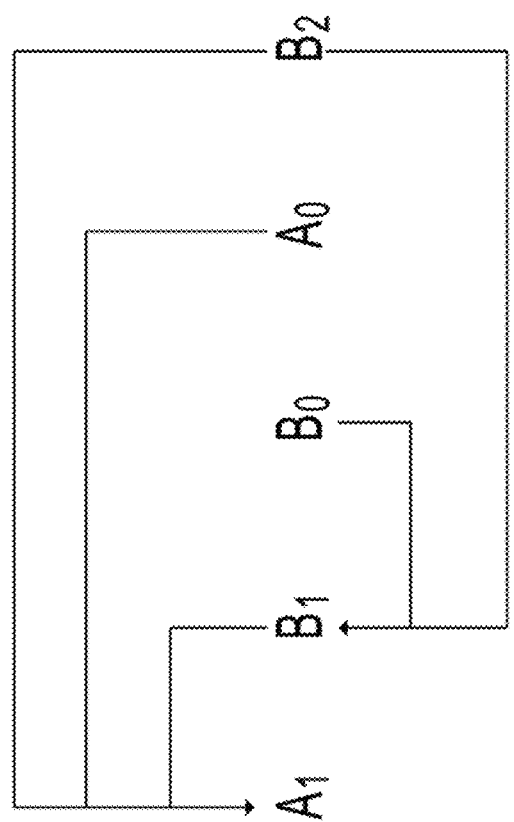
FIG. 10 shows an exemplary redundancy check of spatial merge candidates.

In a spatial candidate derivation, in VVC for example, the derivation of spatial merge candidates can be the same or similar as the derivation of spatial merge candidates in HEVC. A maximum number of merge candidates (e.g., four merge candidates) can be selected among candidates located in positions illustrated in FIG. 9, for example. As shown in FIG. 9, a current block (901) can include neighboring blocks (902)-(906) located at positions $A_0$, $A_1$, $B_0$, $B_1$, and $B_2$ respectively. An order of derivation of spatial merge candidates can be $B_1$, $A_1$, $B_0$, $A_0$, and $B_2$. The position $B_2$ may be considered only when any CU (or block) at the position $A_0$, $B_0$, $B_1$, or $A_1$ is not available (e.g., because the CU belongs to another slice or tile) or is intra coded. After the candidate (or block) at position $A_1$ is added, the addition of the remaining candidates (or blocks) can be subject to a redundancy check. The redundancy check can ensure that candidates with the same motion information are excluded from the merge list so that coding efficiency is improved. To reduce computational complexity, the redundancy check may not consider all possible candidate pairs. Instead, only candidate pairs linked with an arrow in FIG. 10 may be considered. For example, the redundancy check can be applied to 5 candidate pairs, such as a candidate pair of A1 and B1 and a candidate pair of A1 and A0. A candidate may be added to the merge list only if a corresponding candidate that is used for redundancy check does not include the same motion information. For example, the candidate B0 may be added to the merge list only if the corresponding candidate B1 does not include the same motion information.

Figure 11:
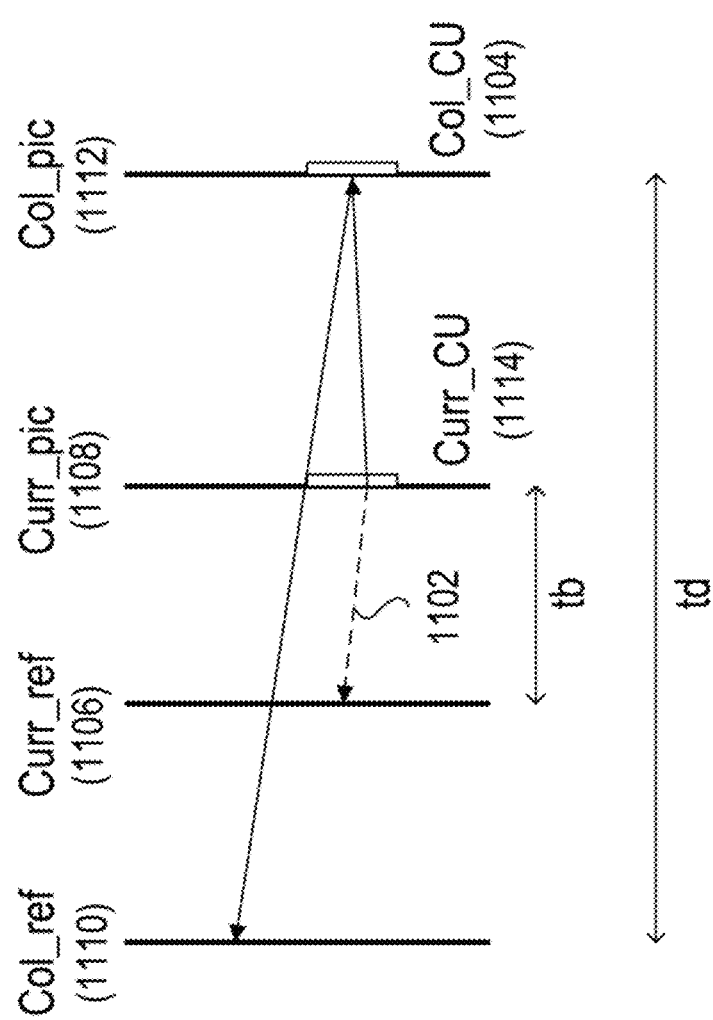
FIG. 11 shows a schematic illustration of motion vector scaling for a temporal merge candidate in accordance with an embodiment.

In a temporal candidate derivation, only one candidate may be added to a merge list. For example, as shown in FIG. 11, in the derivation of the temporal merge candidate for a current CU (1114), a scaled motion vector can be derived based on a co-located CU (1104) which belongs to a collocated reference picture (1112). A reference picture list that is used for the derivation of the co-located CU (1104) can be explicitly signaled in a slice header. The scaled motion vector for the temporal merge candidate can be obtained as illustrated by a dotted line (1102) in FIG. 11, which is scaled from a motion vector of the co-located CU (1104) using picture order count (POC) distances tb and td. tb can be defined as a POC difference between a reference picture of a current picture (e.g., Curr ref) (1106) and the current picture (e.g., Curr pic) (1108). td can be defined as a POC difference between the reference picture of the co-located picture (e.g., Col ref) (1110) and the co-located picture (e.g., Col pic) (1112). A reference picture index of temporal merge candidate can be set equal to zero.

Figure 12:
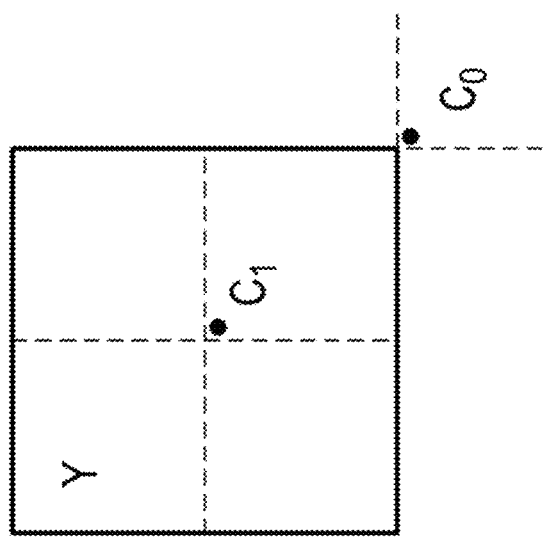
FIG. 12 shows exemplary candidate positions for temporal merge candidates in accordance with an embodiment.

The position for the temporal candidate can be selected between candidates $C_0$ and $C_1$, as shown in FIG. 12. For example, if a CU at the position $C_0$ is not available, is intra coded, or is outside of the current row of CTUs, the position $C_1$ can be used. Otherwise, the position $C_0$ can be used in the derivation of the temporal merge candidate.

Merge with Motion Vector Difference (MMVD) can be used for certain prediction modes, such as either a skip mode or a merge mode with a motion vector expression method. MMVD can re-use merge candidates, such as in VVC. Among the merge candidates, a merge candidate can be selected, and further be expanded (or refined) by the motion vector expression method. MMVD can provide a new motion vector expression with simplified signaling. The motion vector expression method can include a starting point, a motion magnitude, and a motion direction.

MMVD can use a merge candidate list, such as in VVC. Candidates with a default merge type (e.g., MRG TYPE DEFAULT N) can be considered for an expansion of MMVD. In MMVD, a base candidate index can define the starting point. The base candidate index (IDX) can indicate a best candidate among candidates in a list as follows in Table 1, for example.

TABLE 1

| Base candidate IDX | | | | |
|---|---|---|---|---|
| | Base candidate IDX | | | |
| | 0 | 1 | 2 | 3 |
| $N^{th}$ MVP | $1^{st}$ MVP | $2^{nd}$ MVP | $3^{rd}$ MVP | $4^{th}$ MVP |

If the number of base candidates is equal to 1, a base candidate IDX may not be signaled. A distance index can provide motion magnitude information. The distance index can indicate a pre-defined distance from the starting point. A pre-defined distance based on the distance index can be provided in Table 2 as follows:

TABLE 2

| Distance IDX | | | | | | | |
|---|---|---|---|---|---|---|---|
| | Distance IDX | | | | | | |
| 0 | 1 | 2 | 3 | 4 | 5 | 6 | 7 |
| Pixel distance ¼-pel | ½-pel | 1-pel | 2-pel | 4-pel | 8-pel | 16-pel | 32-pel |

A direction index can represent a direction of a MVD relative to the starting point. The direction index can represent four directions as shown in Table 3. A MMVD flag can be signaled right when a skip flag and a merge flag are sent. If the skip flag and the merge flag are true, the MMVD flag can be parsed. If the MMVD flag is equal to 1, MMVD syntaxes can be parsed. But, if the MMVD flag is not 1, an AFFINE flag can be parsed. If the AFFINE flag is equal to 1, an AFFINE mode can be applied. But, if the AFFINE flag is not 1, a skip/merge index can be parsed for a skip/merge mode.

TABLE 3

| | Direction IDX | | | |
|---|---|---|---|---|
| | 00 | 01 | 10 | 11 |
| x-axis | + | − | N/A | N/A |
| y-axis | N/A | N/A | + | − |

Figure 13:
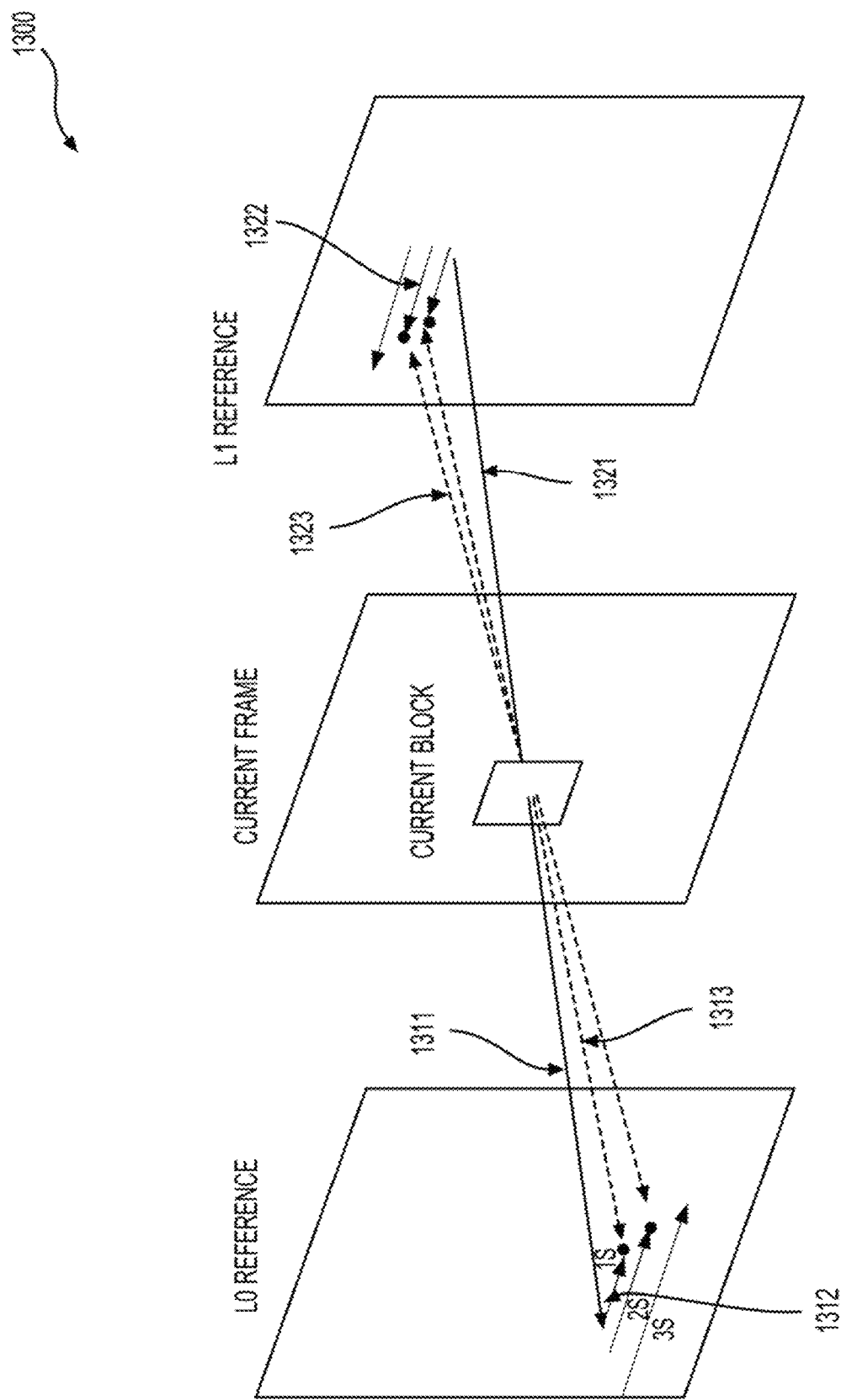
FIG. 13 shows a schematic illustration of a merge with motion vector difference (MMVD) search process.

FIG. 13 shows an exemplary search process of the MMVD. As shown in FIG. 13, the starting point MV can be shown by (1311) (e.g., according to the direction IDX and a base candidate IDX), the offset can be shown by (1312) (e.g., according to the distance IDX and the direction IDX), and the final MV predictor can be shown by (1313) in FIG. 13. In another example, the starting point MV can be shown by (1321) (e.g., according to the direction IDX and a base candidate IDX), the offset can be shown by (1322) (e.g., according to the distance IDX and the direction IDX), and the final MV predictor can be shown by (1323) in FIG. 13.

Figure 14B:
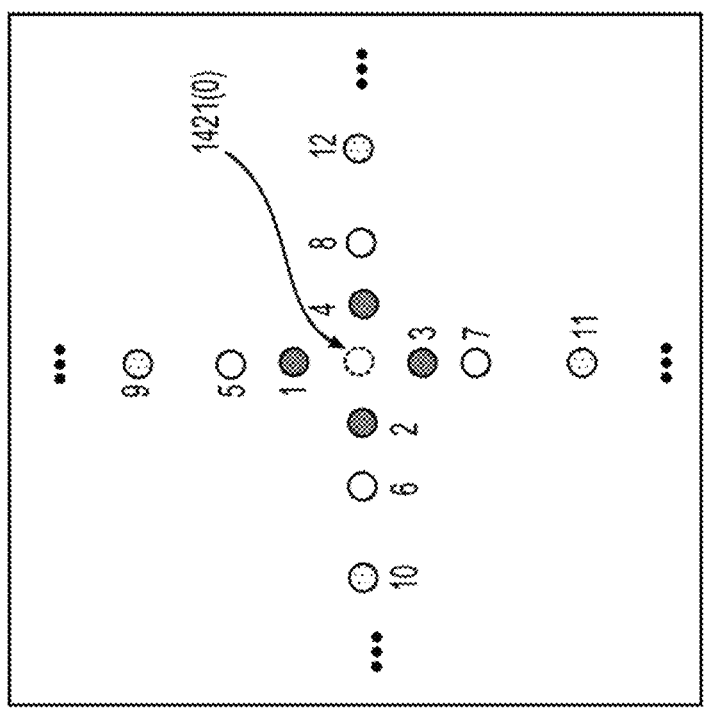
FIG. 14B shows a schematic illustration of search points of an exemplary MMVD process.
Figure 14A:
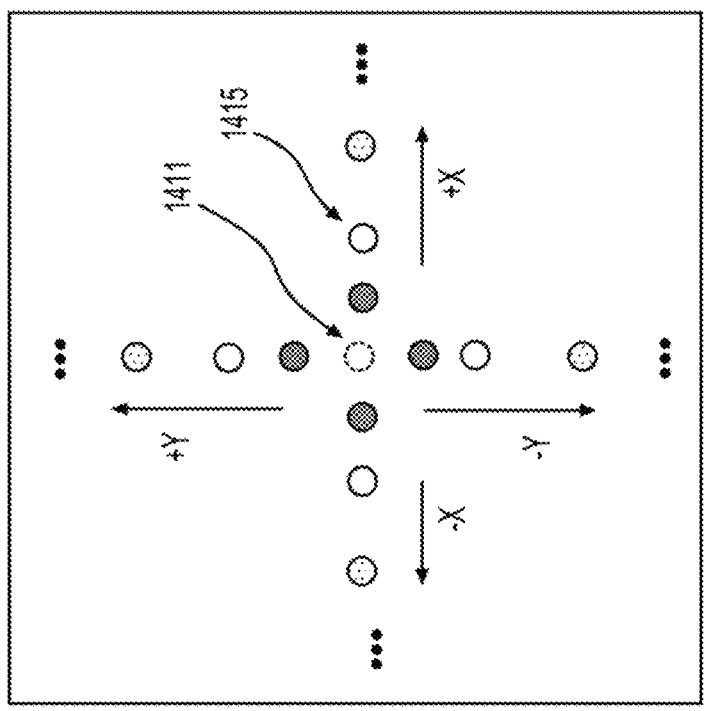
FIG. 14A shows a schematic illustration of search points of an exemplary MMVD process.

FIGS. 14A and 14B show exemplary search points of the MMVD. As shown in FIG. 14A, the starting point MV can be shown by (1411) (e.g., according to the direction IDX and a base candidate IDX) in a first reference list L0. In the FIG. 14A example, 4 search directions, such as +Y, −Y, +X and −X, are used, and the four search directions can be indexed by 0, 1, 2, 3. The distance can be indexed by 0 (0 distance to the starting point MV), 1 (1s (or 1 sample) to the starting point MV), 2 (2s to the starting point MV), 3 (3s to the starting point), and the like. Thus, when the direction IDX is 3, and the distance IDX is 2, the final MV predictor is shown as (1415).

In another example, the search direction and the distance can be combined for indexing. For example, the starting point MV is shown by (1421) (e.g., according to the direction IDX and a base candidate IDX) in a second reference list L1. The search direction and the distance are combined to be indexed by 0-12 as shown in FIG. 14B.

Figure 15:
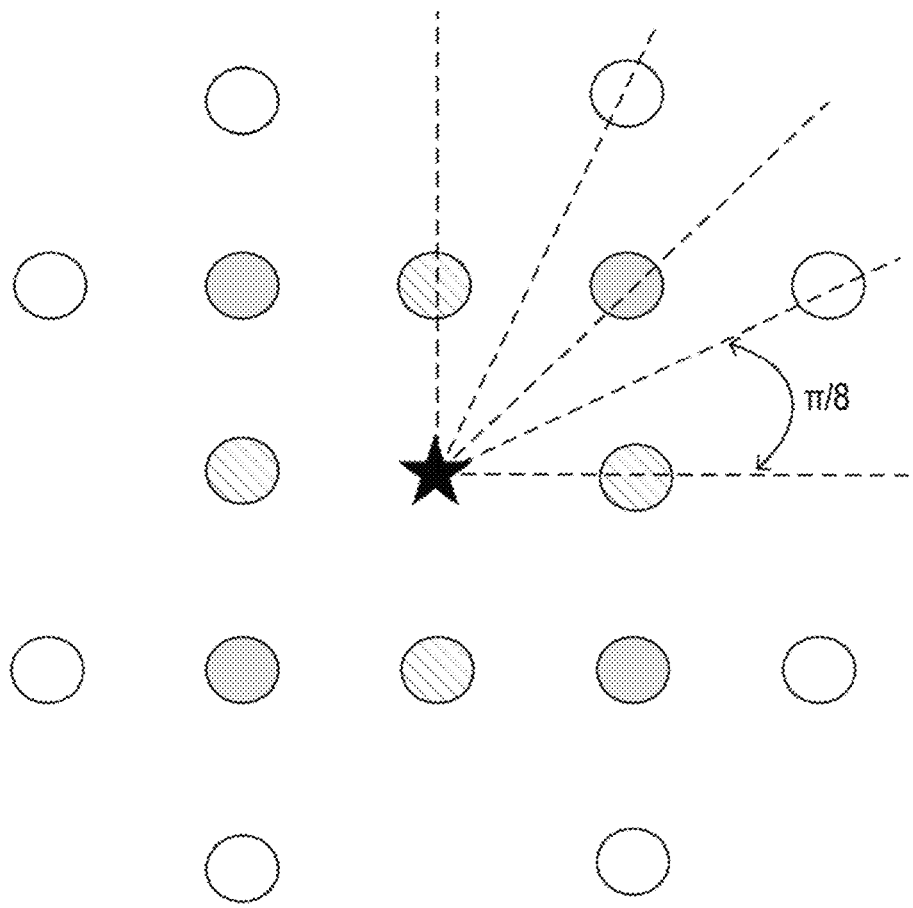
FIG. 15 shows a schematic illustration of additional refinement positions of an exemplary MMVD process.

In template matching based candidate reordering on MMVD and affine MMVD, MMVD offsets can be extended for a MMVD mode and an affine MMVD mode. In an example, additional refinement positions along k×π/8 diagonal angles can be added first. Exemplary additional refinement positions can be shown in FIG. 15, where the number of directions can be increased from 4 to 16. Second, based on a SAD cost between a template (e.g., one row above and one column left of the current block) and a reference of the template for each refinement position, all possible MMVD refinement positions (e.g., 16×6) for each base candidate can be reordered. Finally, top 1/8 refinement positions with smallest template SAD costs can be kept as available positions, consequently for MMVD index coding. The MMVD index can be binarized by a code, such as a rice code with a parameter equal to 2.

In another example, on top of the MMVD extension as described above, affine MMVD reordering can also be extended, in which additional refinement positions along k×π/4 diagonal angles can be added. After reordering, top 1/2 refinement positions with smallest template SAD costs can be kept.

To improve a coding efficiency and reduce a transmission overhead of a motion vector, a subblock-level motion vector refinement can be applied to extend CU level temporal motion vector prediction (TMVP). The subblock-based TMVP (SbTMVP) can inherit motion information at a subblock level from a collocated reference picture (or a reference picture that is collocated with a current picture). Each subblock of a large size CU can have respective motion information without explicitly transmitting a block partition structure or motion information. SbTMVP can obtain motion information for each subblock in three steps. A first step may include a derivation of a displacement vector (DV) of a current CU. At a second step, an availability of SbTMVP candidates can be checked and a central motion can be derived. At a third step, subblock motion information can be derived from a corresponding subblock indicated by the DV. Unlike a TMVP candidate derivation that derives temporal motion vectors from a collocated block in a reference frame, SbTMVP can apply a DV which can be derived from a MV of a left neighboring CU of a current CU to find the corresponding subblock in the collocated picture for each subblock of the current CU. In case that the corresponding subblock is not inter-coded, motion information of the current subblock can be set as the central motion.

SbTMVP can be supported in related coding standards, such as VVC. For example, similar to TMVP in HEVC, SbTMVP can use a motion field in a collocated picture of a current picture to improve a motion vector prediction (e.g., a merge mode) for CUs in the current picture. A collocated picture used by TMVP can also be used for SbTMVP. SbTMVP can be different from TMVP in one or more aspects as follows:
  (1) TMVP predicts a motion at a CU level but SbTMVP predicts a motion at a sub-CU level; and
  (2) TMVP fetches temporal motion vectors from a collocated block in a collocated picture (e.g., the collocated block can be a bottom-right or a center block relative to the current CU). SbTMVP applies a motion shift before fetching temporal motion information from a collocated picture, where the motion shift can be obtained from a motion vector from one of spatial neighboring blocks of the current CU.

Figure 16:
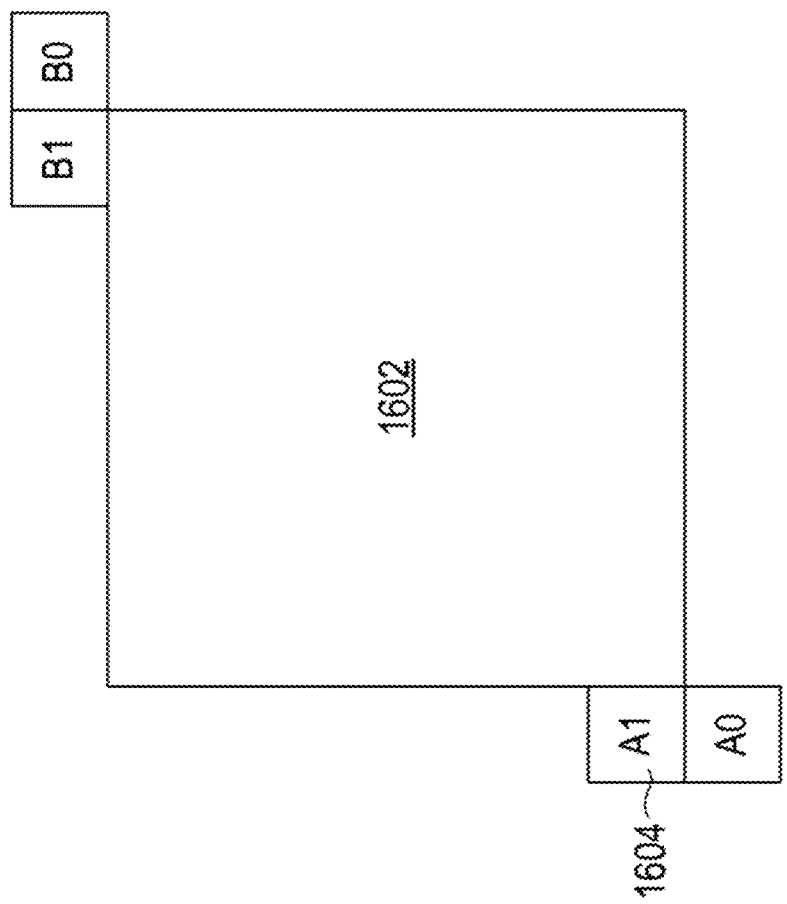
FIG. 16 shows a schematic illustration of exemplary spatial neighboring blocks for subblock-based temporal motion vector prediction (SbTMVP).

Exemplary spatial neighboring blocks applied to SbTMVP can be shown in FIG. 16. As shown in FIG. 16, SbTMVP can predict motion vectors of sub-CUs (not shown) within a current CU (1602) in two steps. In a first step, a spatial neighbor A1 (1604) in FIG. 16 can be examined. If A1 (1604) has a motion vector that uses a collocated picture of a current picture as a reference picture, the motion vector of A1 (1604) can be selected as a motion shift (or a displacement vector) for the SbTMVP to find a corresponding subblock in the collocated picture for each subblock of the current CU. If no such a motion vector is identified, the motion shift can be set to (0, 0).

Figure 17:
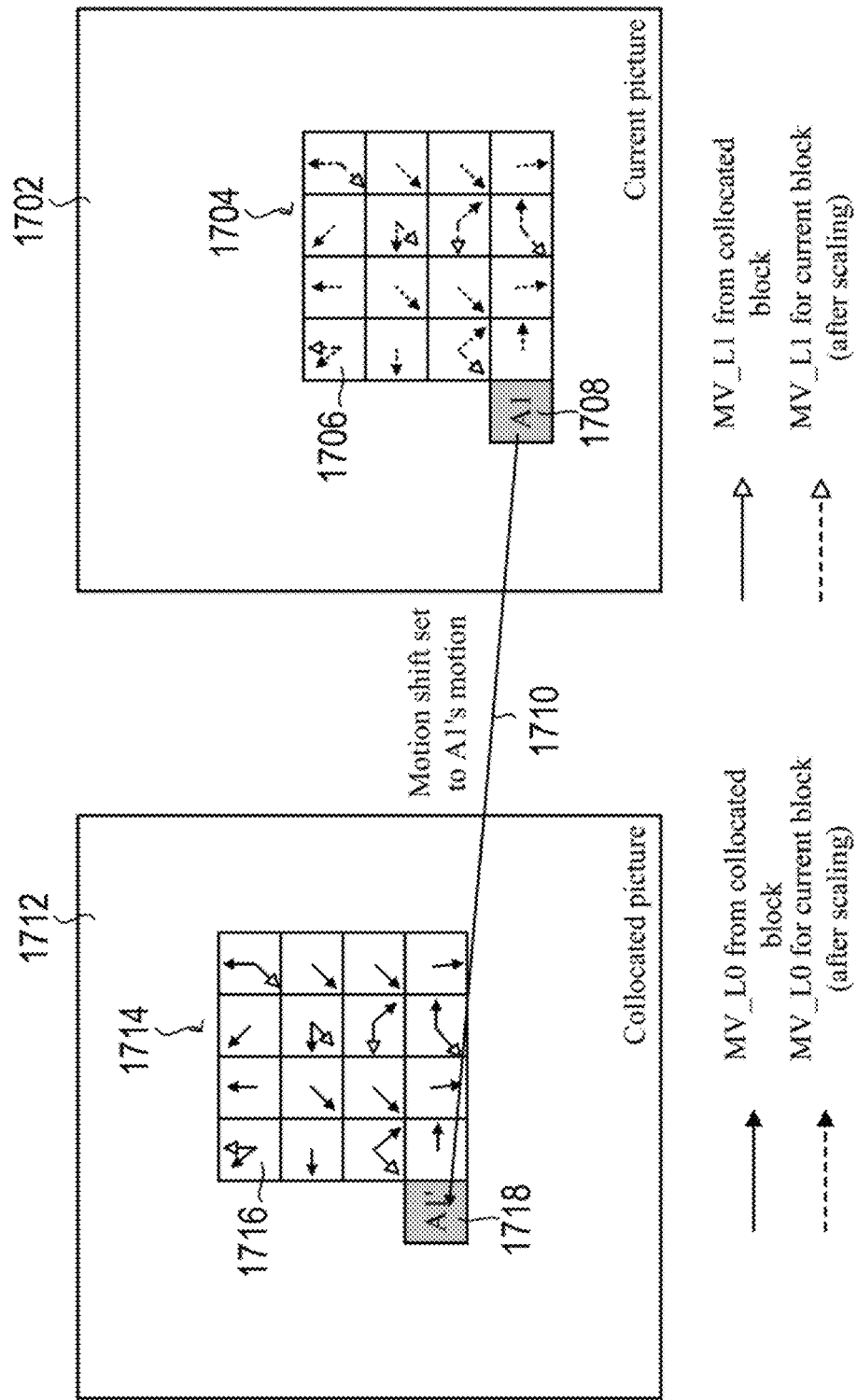
FIG. 17 shows a schematic illustration of an exemplary SbTMVP process.

In a second step, the motion shift identified in the first step can be applied (e.g., added to coordinates of the current CU) to obtain sub CU-level motion information (e.g., motion vectors and reference indices at a sub CU-level) from the collocated picture. As shown in FIG. 17, a current CU (1704) can be included in a current picture (1702). The current CU (1704) can include a plurality of sub-CUs (or subblocks), such as a sub-CU (1706). A neighboring block A1 (1708) can be positioned at a lower left side of the current CU (1704). In an example of FIG. 17, a motion shift (or DV) (1710) can be set as a motion vector of the neighboring block A1 (1708). According to the DV (1710), a reference block A1' (1718) of the neighboring block A1 (1708) can be determined. A reference block (1714) adjacent to the reference block A1' (1718) can be determined as a reference block for the current block (1704). For each sub-CU (e.g., (1706)) in the current block (1704), motion information of a corresponding block (or corresponding sub-CU) (e.g., (1716)) in the reference block (1714), which can be a smallest motion grid that covers a center sample of the corresponding block, in a collocated picture (1712) of the current picture (1702) can be used to derive the motion information for the respective sub-CU. After the motion information of the collocated sub-CU (e.g., (1716)) is identified, the motion information can be converted to motion vectors and reference indices of the current sub-CU (e.g., (1706)). The motion information can be converted in a similar way as the TMVP process of HEVC, where temporal motion scaling can be applied to align temporal motion vectors of reference pictures to the temporal motion vectors of a current CU.

A combined subblock-based merge list which contains both a SbTMVP candidate and affine merge candidates can be used for signalling a subblock-based merge mode (e.g., SbTMVP mode), such as in VVC. The SbTMVP mode can be enabled/disabled by a sequence parameter set (SPS) flag. If the SbTMVP mode is enabled, a SbTMVP predictor can be added as a first entry of a list of subblock-based merge candidates and be followed by the affine merge candidates. A size of the subblock-based merge list can be signalled in SPS and a maximum allowed size of the subblock-based merge list can be 5, such as in VVC.

A sub-CU size used in the SbTMVP mode can be fixed to 8×8, which can be the same as a sub-CU size for an affine merge mode. In an example, the SbTMVP mode may only be applicable to a CU with both a width and a height larger than or equal to 8 (or 8 pixels). A subblock size for the SbTMVP mode can be configurable to other sizes, such as 4×4 in an ECM software model that used for exploration beyond VVC.

In related coding standards, such as in VVC and ECM, subblock-based TMVP (or SbTMVP) can be derived based on a DV that is derived from a MV of a neighboring CU of a current CU. However, the derived SbTMVP and the derived DV may not be the best or most appropriate match with each other.

An extra motion offset of the DV can be signalled for deriving the subblock-based TMVP. However, signaling the extra motion offset may be expensive due to a requirement of extra bits.

In the disclosure, a template matching (TM)-based SbTMVP can be applied. A template of a current block can indicate an area adjacent to the current block, such as a predefined neighboring reconstructed area of the current block. In an example, a template can include top N rows of above neighboring reconstructed samples of the current block, and/or left M columns of left neighboring reconstructed samples of the current block. Example values of M and N can include, but are not limited to 1, 2, 3, 4, or the like.

According to the TM-based SbTMVP, SbTMVP can derive a DV using template matching, instead of using a DV derived from a neighboring CU of a current CU, or further signaling an extra motion offset of the DV. The template of a current coding block (or current block) in a current picture can be compared to each of one or more templates (or reference templates) of multiple blocks (or multiple reference blocks in a collocated reference picture of the current picture) located at specified candidate positions. A cost value C can be calculated for each candidate position (or each of the reference blocks) and be associated with a difference between the template of the current CU and a template of a respective reference block. Motion information in subblocks of K blocks (e.g., K reference blocks in the collocated picture) that are associated with K minimum cost values can be used to derive the SbTMVP (e.g., motion vectors and reference indices of the subblocks in the current block). K can be a number of possible DVs.

Each template of the multiple reference blocks can include a M×N subblock (or region) that is adjacent to a respective reference block in the collocated picture. Motion vectors of each M×N subblock that is adjacent to the block (or the reference block in the collocated picture) and associated with a reference template can be derived from a MV field of the collocated block (or collocated reference block) of the current block. The collocated block can be derived by one of the K displacement motion vectors (DVs) with a given extra motion vector offset (MVO). A derived MV of a subblock of the current block, $SbMV(i, j)_{Lx}$, can be used to point out a location of a subblock template at a reference frame (or the collocated picture).

Figure 18:
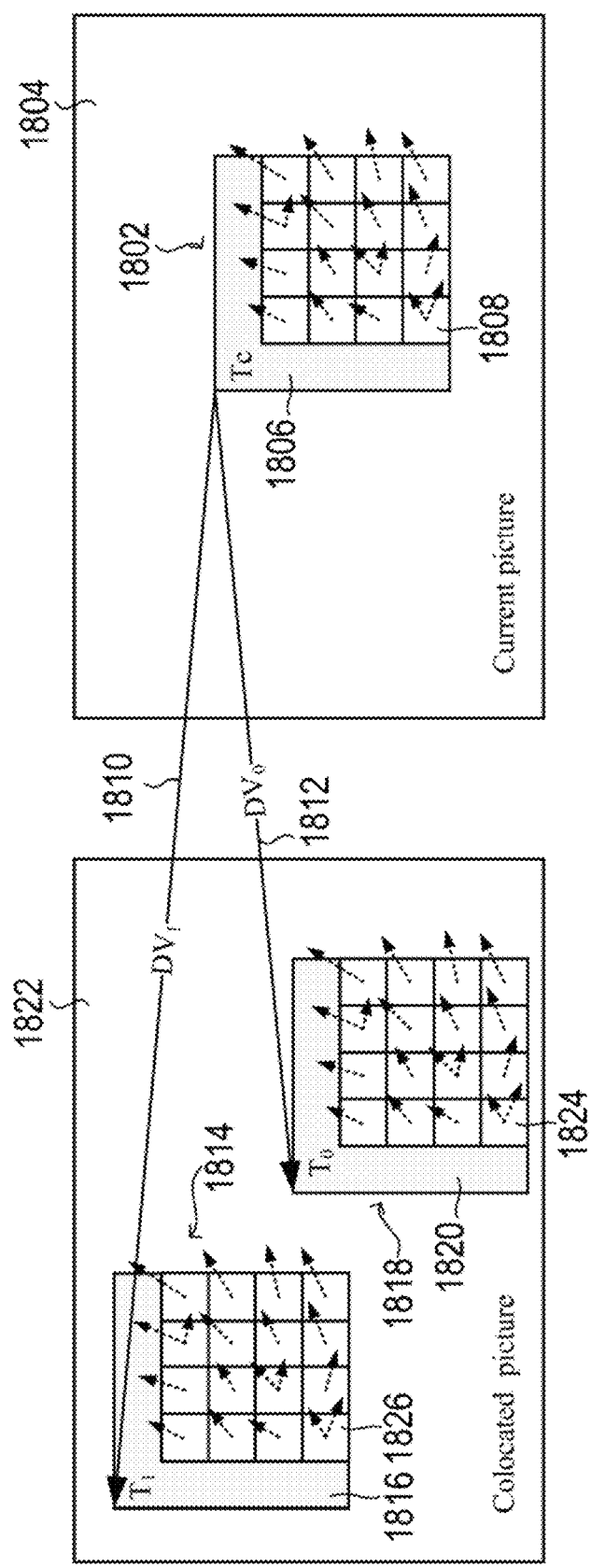
FIG. 18 shows a schematic illustration of an exemplary SbTMVP based on template matching.

An example of the TM-based SbTMVP can be shown in FIG. 18. As shown in FIG. 18, a current block (1802) can be included in a current picture (1804). The current block (1802) can include a template Tc (1806). The template Tc (1806) can include neighboring samples adjacent to a top side and/or a left side of the current block (1802). A plurality of candidate reference blocks can be determined in a search area in a reference picture (1822). A plurality of cost values can be determined based on template matching of the template Tc (1806) of the current block (1802) to templates of the plurality of candidate reference blocks. Each of the plurality of cost values can be based on a difference between the template of the current block and a template of a respective candidate reference block. One or more candidate reference blocks can be selected from the plurality of candidate reference blocks that correspond to one or more lowest cost values of the plurality of cost values. The selected one or more candidate reference blocks can be indicated by one or more DVs. For example, a template $T_0$ (1820) and a template $T_1$ (1816) can be selected that correspond to two least cost values among all candidate templates. The candidate reference block (1818) can be associated with the template $T_0$ (1820) and indicated by a $DV_0$ (1812) from the template $T_c$ to the template $T_0$. The candidate reference block (1814) can be associated with the template $T_1$ (1816) and indicated by a $DV_1$ (1810) from the template $T_c$ to the template $T_1$. Further, motion vectors of subblocks of candidate reference blocks (1814) and (1818) can be used in TMVP for subblocks of the current block (1802). For example, motion information of a subblock (1816) in the candidate reference block (1814) and motion information of a subblock (1824) in the candidate reference block (1818) can be converted, such as based on temporal motion scaling, to motion vectors and/or reference indices of a subblock (1808) in the current block (1802). Prediction samples of the subblock (1808) can further be determined based on the motion vectors and/or reference indices.

In an embodiment, a cost value C can be determined based on a difference between the template of the current block (e.g., (1802)) and the template of each candidate reference block (e.g., (1818)). In an example, the cost value C can be one of a sum of absolute difference (SAD), a sum of absolute transformed difference (SATD), a sum of squares error (SSE), a sub-sampled SAD, and a mean-removed SAD.

In an embodiment, the selected one or more candidate reference blocks can be indicated by K DVs (e.g., $DV_1$ (1810) or $DV_0$ (1812)). The K can be, but is not limited to 1, 2, 3, 4, or the like.

In an embodiment, a search area to find one or more candidate reference block (e.g., the candidate reference blocks (1814) and (1818)) can be defined and centered at a collocated position of a current block in a reference picture/ frame. For example, the search area can be determined as an area centered at a position that is collocated with the current block (1802) in the reference picture (1822).

In an embodiment, a search area can be determined from coded areas of a same picture (e.g., the current picture). For example, the search area can be determined as an area centered on the current block (1802) in the current picture (1804).

In an embodiment, candidate positions (or candidate reference blocks) can be specified by a search area that is identified by a displacement vector. Thus, the search area can be identified by a first DV (not shown). Each candidate position (or candidate reference block) in the search area can be identified by a respective second DV. For example, the candidate reference block (1814) can be indicated by $DV_1$ (1810).

In an embodiment, a DV can be derived from a motion vector of a spatially neighboring coded block of a current block in a current picture. For example, the DV can be derived based on a MVP list of the current block, where the neighboring coded block can be a candidate in the MVP list of the current block.

In an embodiment, a displacement vector can be derived from a motion vector of a regular (e.g., none subblock) merge candidate list of a current block in a current picture. Thus, a temporal motion vector predictor (TMVP) candidate can be excluded from the regular merge candidate list.

In an embodiment, a search area can be a specific area range (or a specific area) centered at a sample pointed (or indicated) by a displacement vector. Examples of the specific area range (or the specific area) can include, but are not limited to a square area, a rectangular area, a diamond shape area, or the like.

In an embodiment, a search area can be a group of samples centered at a sample pointed (or indicated) by a displacement vector.

In an example, the group of samples can be located at the same positions as positions of MVD search points, such as the search points shown in FIGS. 14A and 14B for MMVD.

In an example, the group of samples can include samples that are located at a horizontal direction (or 0 degree direction), a vertical direction (or 90 degree direction), a 45 degree direction, or a 135 degree direction to a sample pointed by a displacement vector.

In an embodiment, a TM-based DV derivation (or TM-based SbTMVP) can be used jointly with another method (e.g., an inter prediction mode or an affine mode). Signaling information, such as a flag, can be signalled or implicitly derived to indicate whether a DV is derived by template matching or signalled by the other method.

In an embodiment, the TM-based DV derivation can be used jointly with another method (e.g., an inter prediction mode or an affine mode). For example, a first DV can be derived by the other method, and a second DV can be derived by template matching in a search area that is identified by the first DV.

When multiple blocks (e.g., K is greater than 1) are identified, for each subblock (e.g., (1808)) of a current coding block (e.g., (1802)), motion vectors associated with collocated subblocks in the multiple K blocks can be used to derive multiple prediction blocks (or multiple prediction subblocks), and motion compensation can be implemented based on a combination of, such as a weighted sum of, the multiple prediction blocks. For example, as shown in FIG. 18, candidate reference blocks (1814) and (1818) can be identified for the current block (1802) based on the TM-based SbTMVP. Motion vectors of the subblock (1826) in the candidate reference block (1814) and the subblock (1824) in the candidate reference block (1818) can be applied to derive a first prediction subblock and a second prediction subblock for the subblock (1808) in the current block (1802). Prediction samples of the subblock (1808) can be determined based on a weighted sum of the first prediction subblock and the second prediction subblock.

In an embodiment, up to S derived DVs with lowest template matching costs can be used as DV candidates for signaling. S can be, but is not limited to 1, 2, 3, 4, or the like. Thus, a maximum code word for signaling the DV candidates may be limited. For example, an encoder can signal up to S DV candidates, and a decoder chooses which one or more of the signaled S DV candidates to use.

In an embodiment, a best (or selected) DV with a lowest template matching cost can be used. Thus, no additional signaling is required for signaling the best DV. In a decoder side, a decoder can perform a same templating matching process as the encoder to derive the best (or selected) DV.

Figure 19:
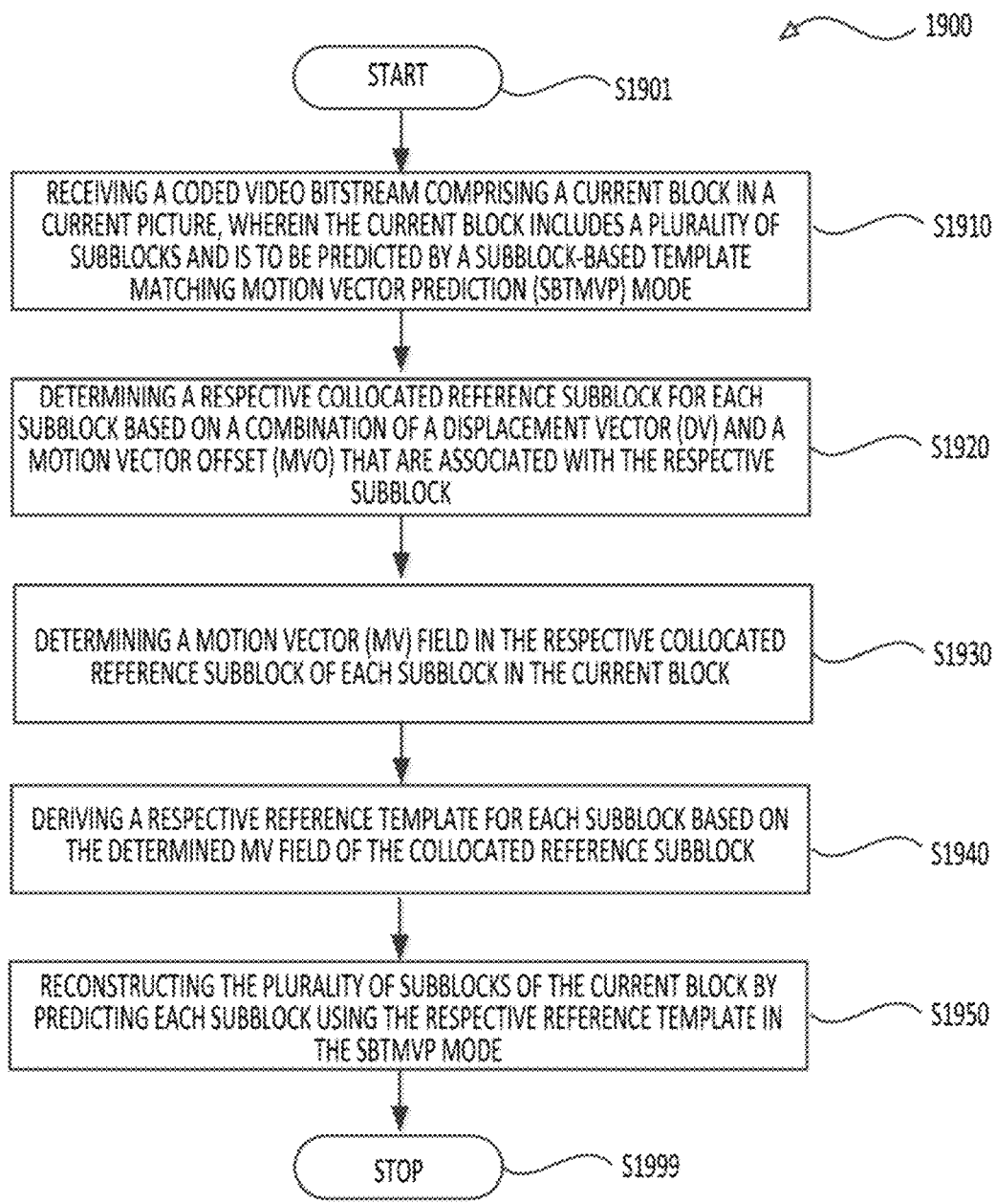
FIG. 19 shows a flow chart outlining an exemplary decoding process according to some embodiments of the disclosure.
Figure 20:
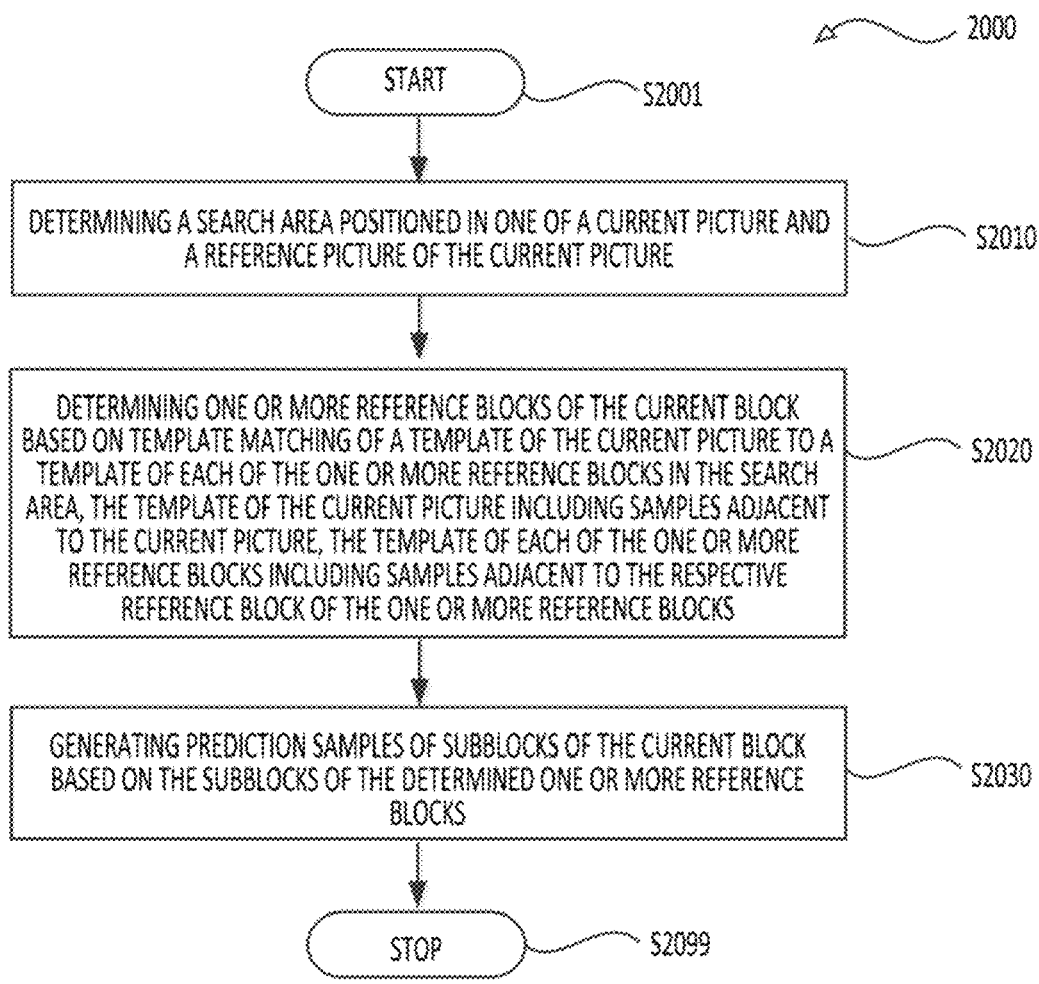
FIG. 20 shows a flow chart outlining an exemplary encoding process according to some embodiments of the disclosure.

FIG. 19 shows a flow chart outlining an exemplary decoding process (1900) according to some embodiments of the disclosure. FIG. 20 shows a flow chart outlining an exemplary encoding process (2000) according to some embodiments of the disclosure. The proposed processes may be used separately or combined in any order. Further, each of the processes (or embodiments), encoder, and decoder may be implemented by processing circuitry (e.g., one or more processors or one or more integrated circuits). In one example, the one or more processors execute a program that is stored in a non-transitory computer-readable medium.

Operations of processes (e.g., (1900) and (2000)) may be combined or arranged in any amount or order, as desired. In embodiments, two or more of the operations of the processes (e.g., (1900) and (2000)) may be performed in parallel.

The processes (e.g., (1900) and (2000)) can be used in the reconstruction and/or encoding of a block, so as to generate a prediction block for the block under reconstruction. In various embodiments, the processes (e.g., (1900) and (2000)) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the processes (e.g., (1900) and (2000)) are implemented in software instructions, thus when the processing circuitry executes the software instructions, the processing circuitry performs the processes (e.g., (1900) and (2000)).

As shown in FIG. 19, the process (1900) can start from (S1901) and proceed to (S1910). At (S1910), a coded video bitstream comprising a current block in a current picture is received. The current block includes a plurality of subblocks and is to be predicted by a subblock-based template matching motion vector prediction (SbTMVP) mode.

At (S1920), a respective collocated reference subblock for each subblock is determined based on a combination of a displacement vector (DV) and a motion vector offset (MVO) that are associated with the respective subblock.

At (S1930), a motion vector (MV) field in the respective collocated reference subblock of each subblock in the current block is determined.

At (S1940), a respective reference template for each subblock is derived based on the determined MV field of the collocated reference subblock.

At (S1950), the plurality of subblocks of the current block is reconstructed by predicting each subblock using the respective reference template in the SbTMVP mode.

To determine the respective collocated reference subblock, a search area positioned in one of the current picture and a reference picture of the current picture is determined. One or more reference blocks of the current block are determined based on template matching of a template of the current block to a template of each of the one or more reference blocks in the search area. The template of the current block includes samples adjacent to the current block. The template of each of the one or more reference blocks includes samples adjacent to the respective reference block of the one or more reference blocks. The respective collocated reference subblock for each subblock is determined as a subblock that is collocated with the respective subblock in one of the one or more reference blocks.

The template matching of the template of the current picture to the template of each of the one or more reference blocks is determined based on one of a SAD, a SATD, a SSE, a sub-sampled SAD, and a mean-removed SAD.

To determine the one or more reference blocks, a plurality of candidate reference blocks is determined in the search area. A plurality of cost values is determined based on the template matching of the template of the current block to templates of the plurality of candidate reference blocks. The one or more reference blocks are determined as the one or more candidate reference blocks of the plurality of candidate reference blocks that correspond to one or more lowest cost values of the plurality of cost values.

In an embodiment, the search area includes one of (i) a region centered at a position that is collocated with the current block in the reference picture and (ii) a region centered on the current block in the current picture.

In an example, the search area can be determined based on a DV. The DV can be derived from one of (i) a motion vector of a spatially neighboring block of the current block and (ii) a motion vector of a merge candidate list of the current block.

In an example, the search area is determined as a region centered at a sample indicated by the DV, where the region is one of square-shaped, rectangular-shaped, and diamond-shaped.

In an example, the search area is determined as a group of samples centered at a sample indicated by the DV. The group of samples can be located at at least one of 0 degrees, 45 degrees, 90 degrees, or 135 degrees with respect to the sample indicated by the DV.

To determine the one or more reference blocks, a first reference block of the one or more reference blocks is determined. The first reference block is indicated by a first DV from the template of the current block to a template of the first reference block. In an example, the first DV is derived based on the template matching such that the first DV corresponds to a cost value associated with a difference between the template of the first reference block and the template of the current block. In an example, the first DV is signaled.

The search area is determined based on a first DV that is derived before the template matching. A first reference block of the one or more reference blocks is determined based on a second DV from the template of the current block to a template of the first reference block. The second DV is derived based on the template matching such that the second DV corresponds to a cost value associated with a difference between the template of the first reference block and the template of the current block.

To reconstruct the subblocks of the current block, one or more motion vectors (MVs) of a first subblock of the plurality of subblocks in the current block are determined based on one or more MVs of subblocks that are collocated with the first subblock in the one or more reference blocks. One or more prediction subblocks of the first subblock of the plurality of subblocks are determined based on the one or more MVs of the first subblock. Prediction samples of the first subblock are determined based on one, or a weighted combination, of the one or more prediction subblocks.

In some embodiments, a plurality of candidate reference blocks of the current block is determined based on a plurality of DVs. Each of the plurality of candidate reference blocks is indicated by a respective DV of the plurality of DVs. The one or more reference blocks of the current block are determined from the plurality of candidate reference blocks based on one or more cost values of the template matching.

After (S1940), the process proceeds to (S1999) and terminates.

The process (1900) can be suitably adapted. Step(s) in the process (1900) can be modified and/or omitted. Additional step(s) can be added. Any suitable order of implementation can be used.

As shown in FIG. 20, the process (2000) can start from (S2001) and proceed to (S2010). At (S2010), a search area positioned in one of a current picture and a reference picture of the current picture is determined.

At (S2020), one or more reference blocks of a current block are determined based on template matching of a template of the current block to a template of each of the one or more reference blocks in the search area. The template of the current block includes samples adjacent to the current block. The template of each of the one or more reference blocks includes samples adjacent to the respective reference block of the one or more reference blocks.

At (S2030), prediction samples of subblocks of the current block are generated based on the subblocks of the determined one or more reference blocks.

Then, the process proceeds to (S2099) and terminates.

The process (2000) can be suitably adapted. Step(s) in the process (2000) can be modified and/or omitted. Additional step(s) can be added. Any suitable order of implementation can be used.

The techniques described above, can be implemented as computer software using computer-readable instructions and physically stored in one or more computer-readable media. For example, FIG. 21 shows a computer system (2100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 21:
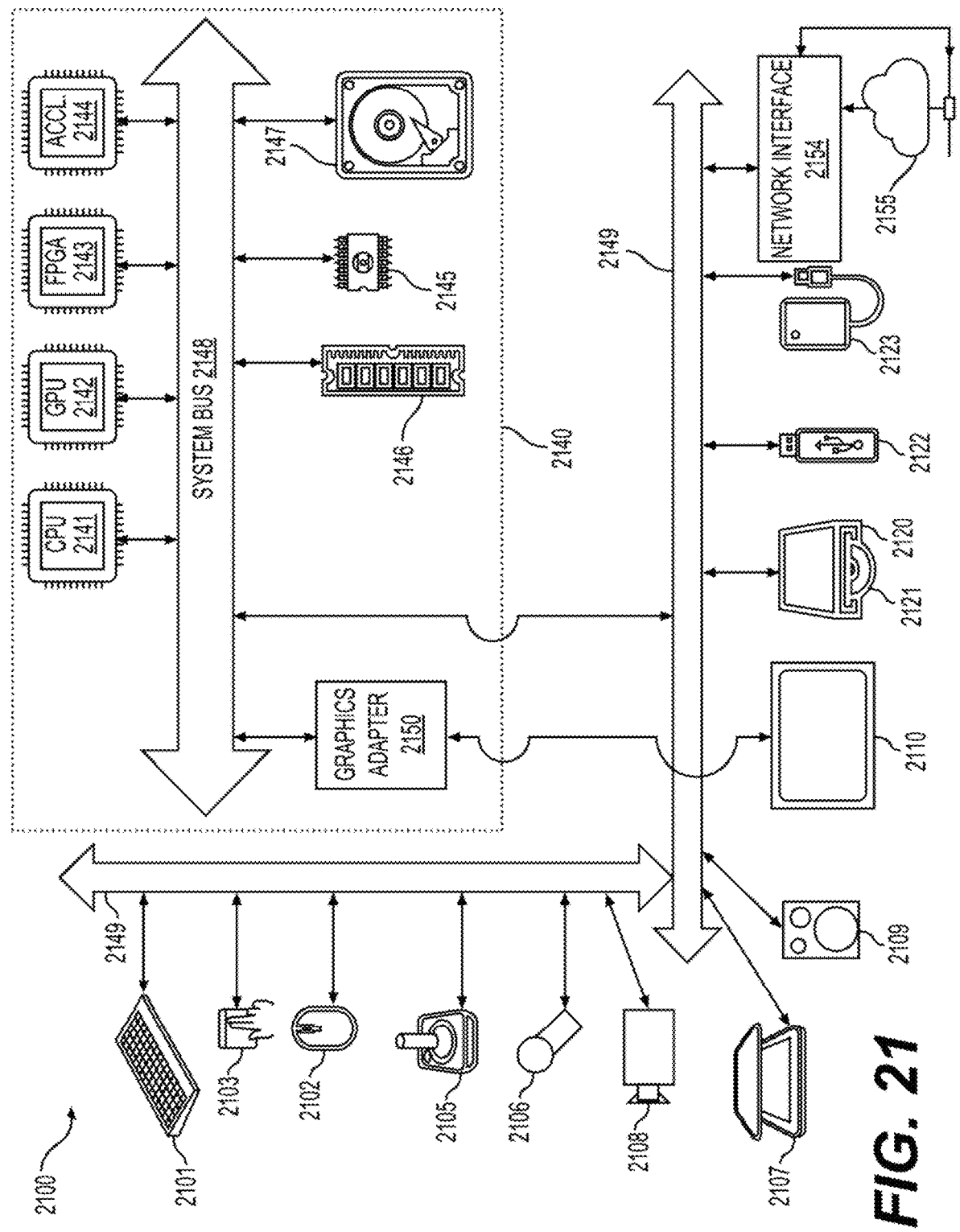
FIG. 21 is a schematic illustration of a computer system in accordance with an embodiment.

The components shown in FIG. 21 for computer system (2100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2100).

Computer system (2100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2101), mouse (2102), trackpad (2103), touch screen (2110), data-glove (not shown), joystick (2105), microphone (2106), scanner (2107), camera (2108).

Computer system (2100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2110), data-glove (not shown), or joystick (2105), but there can also be tactile feedback devices that do not serve as input devices), audio output devices (such as: speakers (2109), headphones (not depicted)), visual output devices (such as screens (2110) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2100) can also include human accessible storage devices and their associated media such as optical media including CD/DVD ROM/RW (2120) with CD/DVD or the like media (2121), thumb-drive (2122), removable hard drive or solid state drive (2123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2100) can also include an interface (2154) to one or more communication networks (2155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2149) (such as, for example USB ports of the computer system (2100)); others are commonly integrated into the core of the computer system (2100) by attachment to a system bus as described below (for example Ethernet interface into a PC computer system or cellular network interface into a smartphone computer system). Using any of these networks, computer system (2100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2140) of the computer system (2100).

The core (2140) can include one or more Central Processing Units (CPU) (2141), Graphics Processing Units (GPU) (2142), specialized programmable processing units in the form of Field Programmable Gate Areas (FPGA) (2143), hardware accelerators for certain tasks (2144), graphics adapters (2150), and so forth. These devices, along with Read-only memory (ROM) (2145), Random-access memory (2146), internal mass storage such as internal non-user accessible hard drives, SSDs, and the like (2147), may be connected through a system bus (2148). In some computer systems, the system bus (2148) can be accessible in the form of one or more physical plugs to enable extensions by additional CPUs, GPU, and the like. The peripheral devices can be attached either directly to the core's system bus (2148), or through a peripheral bus (2149). In an example, the screen (2110) can be connected to the graphics adapter (2150). Architectures for a peripheral bus include PCI, USB, and the like.

CPUs (2141), GPUs (2142), FPGAs (2143), and accelerators (2144) can execute certain instructions that, in combination, can make up the aforementioned computer code. That computer code can be stored in ROM (2145) or RAM (2146). Transitional data can also be stored in RAM (2146), whereas permanent data can be stored for example, in the internal mass storage (2147). Fast storage and retrieve to any of the memory devices can be enabled through the use of cache memory, that can be closely associated with one or more CPU (2141), GPU (2142), mass storage (2147), ROM (2145), RAM (2146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2100), and specifically the core (2140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2140) that are of non-transitory nature, such as core-internal mass storage (2147) or ROM (2145). The software implementing various embodiments of the present disclosure can be stored in such devices and executed by core (2140). A computer-readable medium can include one or more memory devices or chips, according to particular needs. The software can cause the core (2140) and specifically the processors therein (including CPU, GPU, FPGA, and the like) to execute particular processes or particular parts of particular processes described herein, including defining data structures stored in RAM (2146) and modifying such data structures according to the processes defined by the software. In addition or as an alternative, the computer system can provide functionality as a result of logic hardwired or otherwise embodied in a circuit (for example: accelerator (2144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of decoding performed in a decoder, the method comprising:
receiving a coded video bitstream comprising a current block in a current picture, wherein the current block includes a plurality of subblocks and is to be predicted by a subblock-based template matching motion vector prediction (SbTMVP) mode;
determining a respective collocated reference subblock for each subblock based on a combination of a displacement vector (DV) and a motion vector offset (MVO) that are associated with the respective subblock;
determining a motion vector (MV) field in the respective collocated reference subblock of each subblock in the current block;
deriving a respective reference template for each subblock based on the determined MV field of the collocated reference subblock; and
reconstructing the plurality of subblocks of the current block by predicting each subblock using the respective reference template in the SbTMVP mode.

2. The method of claim 1, wherein the determining the respective collocated reference subblock further comprises:
determining a search area positioned in one of the current picture and a reference picture of the current picture;
determining one or more reference blocks of the current block based on template matching of a template of the current block to a template of each of the one or more reference blocks in the search area, the template of the current block including samples adjacent to the current block, the template of each of the one or more reference blocks including samples adjacent to the respective reference block of the one or more reference blocks; and
determining the respective collocated reference subblock for each subblock as a subblock that is collocated with the respective subblock in one of the one or more reference blocks.

3. The method of claim 2, wherein the template matching of the template of the current block to the template of each of the one or more reference blocks is determined based on one of a sum of absolute difference (SAD), a sum of absolute transformed difference (SATD), a sum of squares error (SSE), a sub-sampled SAD, and a mean-removed SAD.

4. The method of claim 3, wherein the determining the one or more reference blocks further comprises:
determining a plurality of candidate reference blocks in the search area;
determining a plurality of cost values based on the template matching of the template of the current block to templates of the plurality of candidate reference blocks; and
determining the one or more reference blocks as the one or more candidate reference blocks of the plurality of candidate reference blocks that correspond to one or more lowest cost values of the plurality of cost values.

5. The method of claim 2, wherein the search area includes one of (i) a region centered at a position that is collocated with the current block in the reference picture and (ii) a region centered on the current block in the current picture.

6. The method of claim 2, wherein the determining the search area further comprises:
determining the search area based on a displacement vector (DV), the DV being derived from one of (i) a motion vector of a spatially neighboring block of the current block and (ii) a motion vector of a merge candidate list of the current block.

7. The method of claim 6, wherein the determining the search area further comprises:
determining the search area as a region centered at a sample indicated by the DV, the region being one of square-shaped, rectangular-shaped, and diamond-shaped.

8. The method of claim 6, wherein the determining the search area further comprises:
determining the search area as a group of samples centered at a sample indicated by the DV, the group of samples being located at at least one of 0 degrees, 45 degrees, 90 degrees, or 135 degrees with respect to the sample indicated by the DV.

9. The method of claim 2, wherein the determining the one or more reference blocks further comprises:
determining a first reference block of the one or more reference blocks that is indicated by a first displacement vector (DV) from the template of the current block to a template of the first reference block, the first DV being one of (i) derived based on the template matching such that the first DV corresponds to a cost value associated with a difference between the template of the first reference block and the template of the current block and (ii) signaled.

10. The method of claim 2, wherein:
the determining the search area further comprises:
determining the search area based on a first displacement vector (DV) that is derived before the template matching; and
the determining the one or more reference blocks further comprises:
determining a first reference block of the one or more reference blocks that is indicated by a second DV from the template of the current block to a template of the first reference block, the second DV being derived based on the template matching such that the second DV corresponds to a cost value associated with a difference between the template of the first reference block and the template of the current block.

11. The method of claim 2, wherein the reconstructing the plurality of subblocks of the current block further comprises:
determining one or more motion vectors (MVs) of a first subblock of the plurality of subblocks in the current block based on one or more MVs of subblocks that are collocated with the first subblock in the one or more reference blocks;
determining one or more prediction subblocks of the first subblock of the plurality of subblocks based on the one or more MVs of the first subblock; and
determining prediction samples of the first subblock based on one, or a weighted combination, of the one or more prediction subblocks.

12. The method of claim 2, further comprising:
determining a plurality of candidate reference blocks of the current block based on a plurality of displacement vectors (DVs), each of the plurality of candidate reference blocks being indicated by a respective DV of the plurality of DVs; and
determining the one or more reference blocks of the current block from the plurality of candidate reference blocks based on one or more cost values of the template matching.

13. A method of processing visual media data, the method comprising:
processing a bitstream that includes the visual media data according to a format rule, wherein the bitstream includes a current block in a current picture, wherein the current block includes a plurality of subblocks and is to be predicted by a subblock-based template matching motion vector prediction (SbTMVP) mode; and
the format rule specifies that:
a respective collocated reference subblock for each subblock is determined based on a combination of a displacement vector (DV) and a motion vector offset (MVO) that are associated with the respective subblock;
a motion vector (MV) field in the respective collocated reference subblock of each subblock in the current block is determined;
a respective reference template for each subblock is processed based on the determined MV field of the collocated reference subblock; and
the plurality of subblocks of the current block is reconstructed by predicting each subblock using the respective reference template in the SbTMVP mode.

14. The method of claim 13, wherein the format rule further specifies:
a search area positioned in one of the current picture and a reference picture of the current picture is determined;
one or more reference blocks of the current block is determined based on template matching of a template of the current block to a template of each of the one or more reference blocks in the search area, the template of the current block including samples adjacent to the current block, the template of each of the one or more reference blocks including samples adjacent to the respective reference block of the one or more reference blocks; and
the respective collocated reference subblock for each subblock is determined as a subblock that is collocated with the respective subblock in one of the one or more reference blocks.

15. The method of claim 14, wherein the template matching of the template of the current block to the template of each of the one or more reference blocks is determined based on one of a sum of absolute difference (SAD), a sum of absolute transformed difference (SATD), a sum of squares error (SSE), a sub-sampled SAD, and a mean-removed SAD.

16. The method of claim 15, wherein the format rule further specifies:
a plurality of candidate reference blocks in the search area is determined;
a plurality of cost values is determined based on the template matching of the template of the current block to templates of the plurality of candidate reference blocks; and
the one or more reference blocks is determined as the one or more candidate reference blocks of the plurality of candidate reference blocks that correspond to one or more lowest cost values of the plurality of cost values.

17. A method for video encoding in a video encoder, the method comprising:
receiving a video bitstream comprising a current block in a current picture, wherein the current block includes a plurality of subblocks and is to be predicted by a subblock-based template matching motion vector prediction (SbTMVP) mode;
processing a respective collocated reference subblock for each subblock based on a combination of a displacement vector (DV) and a motion vector offset (MVO) that are associated with the respective subblock;

processing a motion vector (MV) field in the respective collocated reference subblock of each subblock in the current block;

deriving a respective reference template for each subblock based on the processed MV field of the collocated reference subblock; and encoding the plurality of subblocks of the current block by predicting each subblock using the respective reference template in the SbTMVP mode.

18. The method of claim 17, wherein the method further comprises:

determining a search area positioned in one of the current picture and a reference picture of the current picture;

determining one or more reference blocks of the current block based on template matching of a template of the current block to a template of each of the one or more reference blocks in the search area, the template of the current block including samples adjacent to the current block, the template of each of the one or more reference blocks including samples adjacent to the respective reference block of the one or more reference blocks; and determining the respective collocated reference subblock for each subblock as a subblock that is collocated with the respective subblock in one of the one or more reference blocks.

19. The method of claim 18, wherein the template matching of the template of the current block to the template of each of the one or more reference blocks is determined based on one of a sum of absolute difference (SAD), a sum of absolute transformed difference (SATD), a sum of squares error (SSE), a sub-sampled SAD, and a mean-removed SAD.

20. The method of claim 19, wherein the method further comprises:

determining a plurality of candidate reference blocks in the search area;

determining a plurality of cost values based on the template matching of the template of the current block to templates of the plurality of candidate reference blocks; and determining the one or more reference blocks as the one or more candidate reference blocks of the plurality of candidate reference blocks that correspond to one or more lowest cost values of the plurality of cost values.

* * * * *